US012629686B2

(12) United States Patent
Ito

(10) Patent No.: US 12,629,686 B2
(45) Date of Patent: May 19, 2026

(54) FLOW PATH PLATE FOR THERMAL CYCLE AND THERMAL CYCLE DEVICE

(71) Applicant: ALPS ALPINE CO., LTD., Tokyo (JP)

(72) Inventor: Junko Ito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 296 days.

(21) Appl. No.: 18/639,578

(22) Filed: Apr. 18, 2024

(65) Prior Publication Data

US 2024/0278250 A1 Aug. 22, 2024

Related U.S. Application Data

(63) Continuation of application No. PCT/JP2022/038090, filed on Oct. 12, 2022.

(30) Foreign Application Priority Data

Nov. 16, 2021 (JP) ................................ 2021-186649

(51) Int. Cl.
*B01L 7/00* (2006.01)

(52) U.S. Cl.
CPC ......... *B01L 7/52* (2013.01); *B01L 2300/0816* (2013.01); *B01L 2300/0883* (2013.01); *B01L 2300/1838* (2013.01)

(58) Field of Classification Search
CPC ............... B01L 7/52; B01L 2300/0816; B01L 2300/0883; B01L 2300/1838; B01L 7/525; C12M 1/00
See application file for complete search history.

(56) References Cited

U.S. PATENT DOCUMENTS 6,243,508 B1 6/2001 Jewell et al.
11,209,197 B2 * 12/2021 Yabuhara ................. B01L 7/00
(Continued)

FOREIGN PATENT DOCUMENTS

JP 2014053471 A * 3/2014
JP 2017-504348 2/2017
(Continued)

OTHER PUBLICATIONS

International Search Report for PCT/JP2022/038090 mailed on Dec. 13, 2022.

*Primary Examiner* — Francis C Gray
(74) *Attorney, Agent, or Firm* — IPUSA, PLLC

(57) ABSTRACT

A flow path plate for thermal cycle includes a plate-shaped member extending in a horizontal direction, a heating flow path extending in a horizontal direction in the plate-shaped member, a cooling flow path extending in a horizontal direction in the plate-shaped member, a connecting flow path connecting the heating flow path and the cooling flow path, a heating-target surface contacted by a first temperature adjuster configured to heat the heating flow path, and a cooling-target surface contacted by a second temperature adjuster configured to cool the cooling flow path at a temperature lower than that by the first temperature adjuster. A target sample is conveyed from the heating flow path to the cooling flow path, the heating-target surface is situated under the heating flow path, and the cooling-target surface is situated above the cooling flow path.

5 Claims, 20 Drawing Sheets

(56) References Cited

U.S. PATENT DOCUMENTS

| | | | | |
|---|---|---|---|---|
| 11,933,716 | B2 * | 3/2024 | Ito | G01N 21/85 |
| 2012/0308990 | A1 * | 12/2012 | TerMaat | B01L 7/52<br>435/3 |
| 2017/0008000 | A1 | 1/2017 | Kim | |
| 2018/0274019 | A1 | 9/2018 | Fukuzawa et al. | |
| 2019/0185909 | A1 * | 6/2019 | Li | B01L 7/52 |

FOREIGN PATENT DOCUMENTS

| | | |
|---|---|---|
| JP | 2018-117601 | 8/2018 |
| JP | 6803030 | 12/2020 |
| WO | 2017/094674 | 6/2017 |

* cited by examiner

FLOW PATH PLATE FOR THERMAL CYCLE AND THERMAL CYCLE DEVICE

CROSS-REFERENCE TO RELATED APPLICATIONS

This application is a continuation application of International Application No. PCT/JP2022/038090, filed on Oct. 12, 2022, and designating the U.S., which is based upon and claims priority to Japanese Patent Application No. 2021-186649, filed on Nov. 16, 2021, the entire contents of which are incorporated herein by reference.

BACKGROUND

Technical Field

The present invention relates to a flow path plate for thermal cycle and a thermal cycle device.

Background Art

Flow path plates for thermal cycle internally including a flow path of a micron order (a micro flow path) are used in genetic testing and the like in which a very small quantity part of a DNA, which constitutes a gene, is amplified and analyzed, because such flow path plates generally require only small quantities of a measurement-target sample and a reagent for the analysis.

As a flow path plate for thermal cycle, for example, a PCR reaction container including: a resin substrate including a groove-like flow path in a lower surface; a flow path sealing film for sealing the flow path, which is pasted on the lower surface of the substrate; and a sealing film pasted on the upper surface of the substrate is disclosed (for example, see Japanese Patent No. 6803030).

According to Japanese Patent No. 6803030, the PCR reaction container is placed on a first heater and a second heater such that two reaction regions in a thermal cycle region of the flow path in the PCR reaction container are positioned on the first heater and the second heater. A sample obtained by mixing a biological sample containing DNA with a PCR reagent containing a primer, an enzyme, and the like is supplied into the flow path, the thermal cycle region of the flow path is heated, and the sample flowing through the flow path is moved back and forth in the thermal cycle region. A predetermined thermal cycle is applied to the sample to make the sample repeatedly undergo modification, annealing, and elongation. In this way, a specific part of the DNA is selectively amplified, and the amplified product is analyzed.

SUMMARY

According to Japanese Patent No. 6803030, as the first heater and the second heater are both set under the PCR reaction container, the sample passing through the flow path in the reaction regions positioned above the first heater and the second heater are heated from under in both of the reaction regions. Hence, a convection flow of the sample flowing from a lower side to an upper side occurs in the flow path positioned above the first heater. However, when the sample having been heated by the first heater is to be cooled to a temperature lower than that by the first heater in the flow path positioned above the second heater, the sample to pass through the flow path positioned above the second heater has a temperature higher than the temperature of the second heater. Hence, the sample passing through the flow path positioned above the second heater does not convect. As a result, a long time is taken until the temperature distribution of the sample passing through the flow path positioned above the second heater becomes uniform, giving rise to a problem that the sample processing time in the PCR reaction container is long.

An object of an embodiment of the present invention is to provide a flow path plate for thermal cycle that can shorten the sample processing time in a flow path.

An embodiment of a flow path plate for thermal cycle according to the present invention is a flow path plate for thermal cycle including a plate-shaped member extending in a horizontal direction, a heating flow path extending in a horizontal direction in the plate-shaped member, a cooling flow path extending in a horizontal direction in the plate-shaped member, a connecting flow path connecting the heating flow path and the cooling flow path, a heating-target surface contacted by a first temperature adjuster configured to heat the heating flow path, and a cooling-target surface contacted by a second temperature adjuster configured to cool the cooling flow path at a temperature lower than that by the first temperature adjuster, wherein a sample containing a nucleic acid is conveyed from the heating flow path to the cooling flow path, the heating-target surface is situated under the heating flow path, and the cooling-target surface is situated above the cooling flow path.

An embodiment of the flow path plate for thermal cycle according to the present invention can shorten the sample processing time in the flow path.

DETAILED DESCRIPTION OF THE INVENTION

Figure 1:
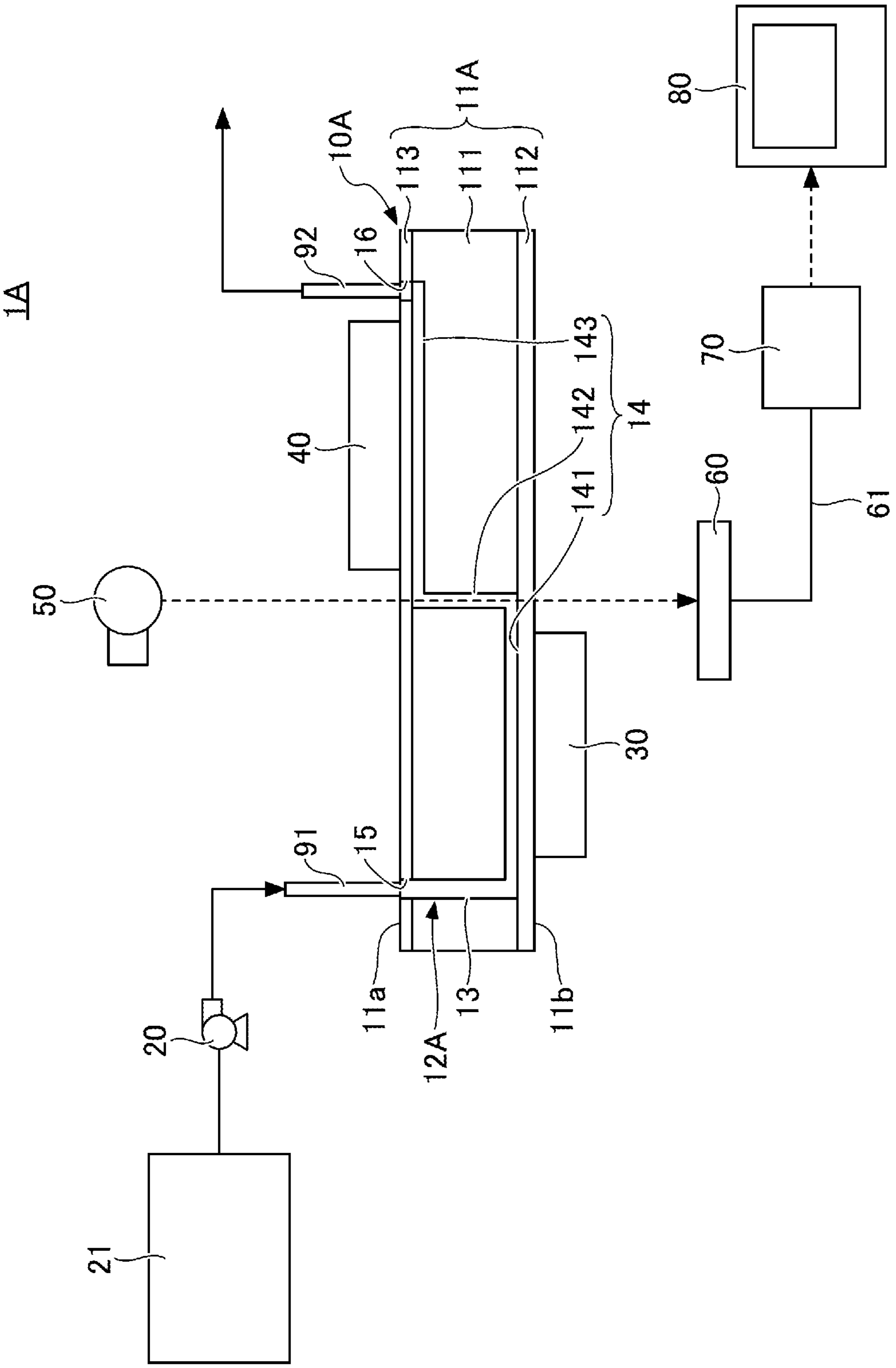
FIG. 1 is a view illustrating the configuration of a thermal cycle device including a flow path plate for thermal cycle according to a first embodiment.

Embodiments of the present invention will be described below in detail. To facilitate understanding of the description, the same components in the drawings will be denoted by the same reference numerals, and overlapping descriptions of the same components are omitted. The components in the drawings may not be to scale. In the present specification, the term "through" indicating numerical ranges is meant to include the values specified before and after "through" as the lower limit and the upper limit, unless otherwise particularly specified.

First Embodiment

<Thermal Cycle Device>

A thermal cycle device including a flow path plate for thermal cycle according to a first embodiment will be described. FIG. 1 is a view illustrating the configuration of a thermal cycle device including a flow path plate for thermal cycle according to the first embodiment. As illustrated in FIG. 1, a thermal cycle device 1A according to the present embodiment includes a flow path plate 10A for thermal cycle, a conveying member 20, a first temperature adjuster 30, a second temperature adjuster 40, a light-emitting member 50, a light-receiving member 60, a control unit 70, and a display unit 80, and is configured to promote the nucleic acid amplification reaction of a nucleic acid contained in a nucleic acid-containing sample.

The thermal cycle device 1A can bring efficiency to an analysis by shortening the processing time taken for an amplification reaction of a nucleic acid, when promoting the amplification reaction of the nucleic acid contained in a sample conveyed into the flow path plate 10A for thermal cycle by the conveying member 20.

The sample is a nucleic acid-containing sample, and an example of the sample is an analyte obtained by mixing a DNA-containing biological sample such as blood, nasal mucus, saliva, urine, and the like with a PCR reagent containing a primer, an enzyme, and the like. In the present embodiment, a case in which the sample is an analyte obtained by mixing a biological sample with a PCR reagent will be described.

Nucleic acid amplification reactions are utilized in, for example, a method of detecting a trace DNA constituting a gene with a high sensitivity by amplifying a part of DNA, and analyzing the detected DNA. Among nucleic acid amplification reactions, a Polymerase Chain Reaction (PCR) is effectively utilized as a method for selectively amplifying a specific part of a very small quantity of a DNA collected from a living body and the like to identify the gene polymorphism (SNP) of the living organism, or a method for inspecting the amount of expression of a gene introduced into a cell.

(Flow Path Plate for Thermal Cycle)

Figure 2:
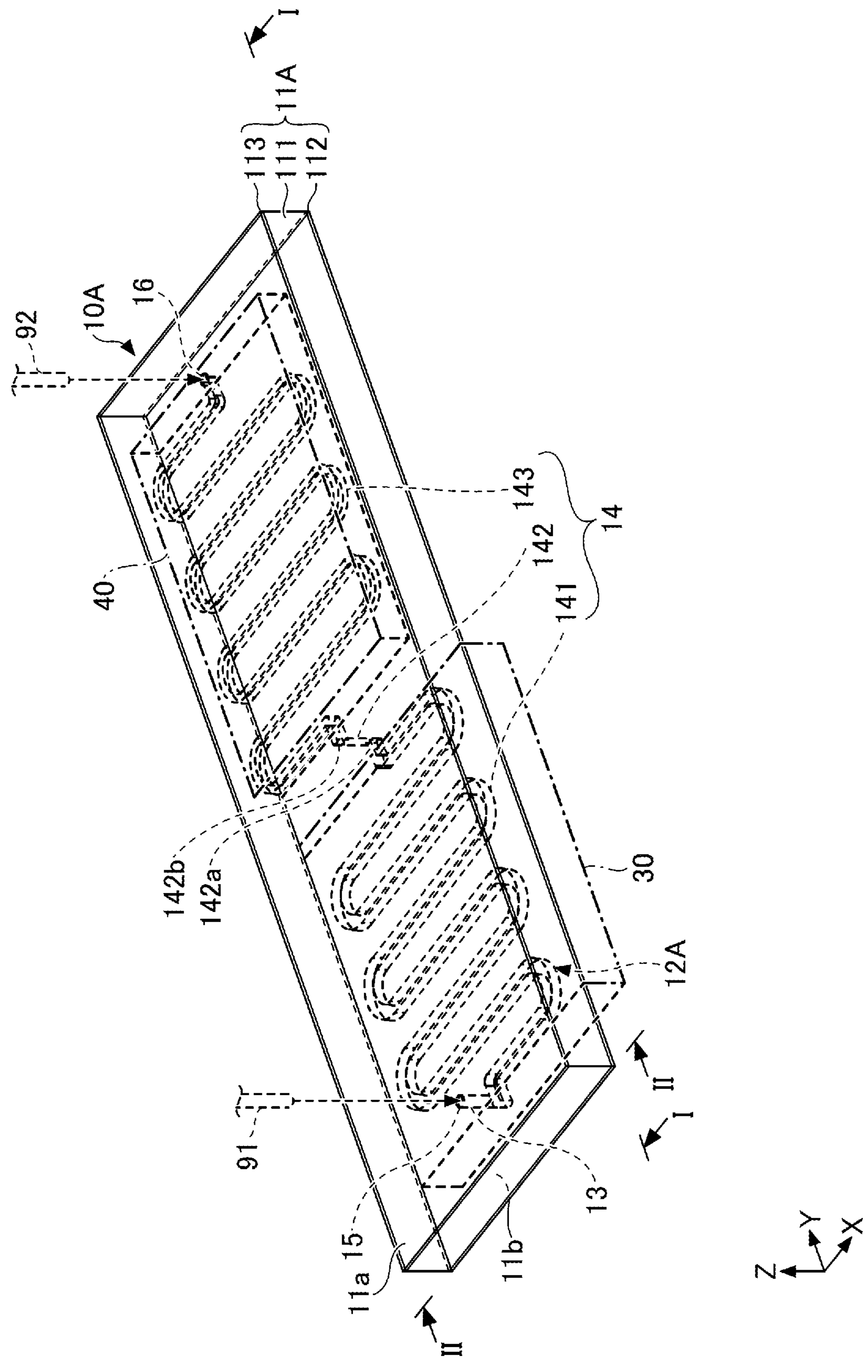
FIG. 2 is an oblique view of a flow path plate for thermal cycle.
Figure 3:
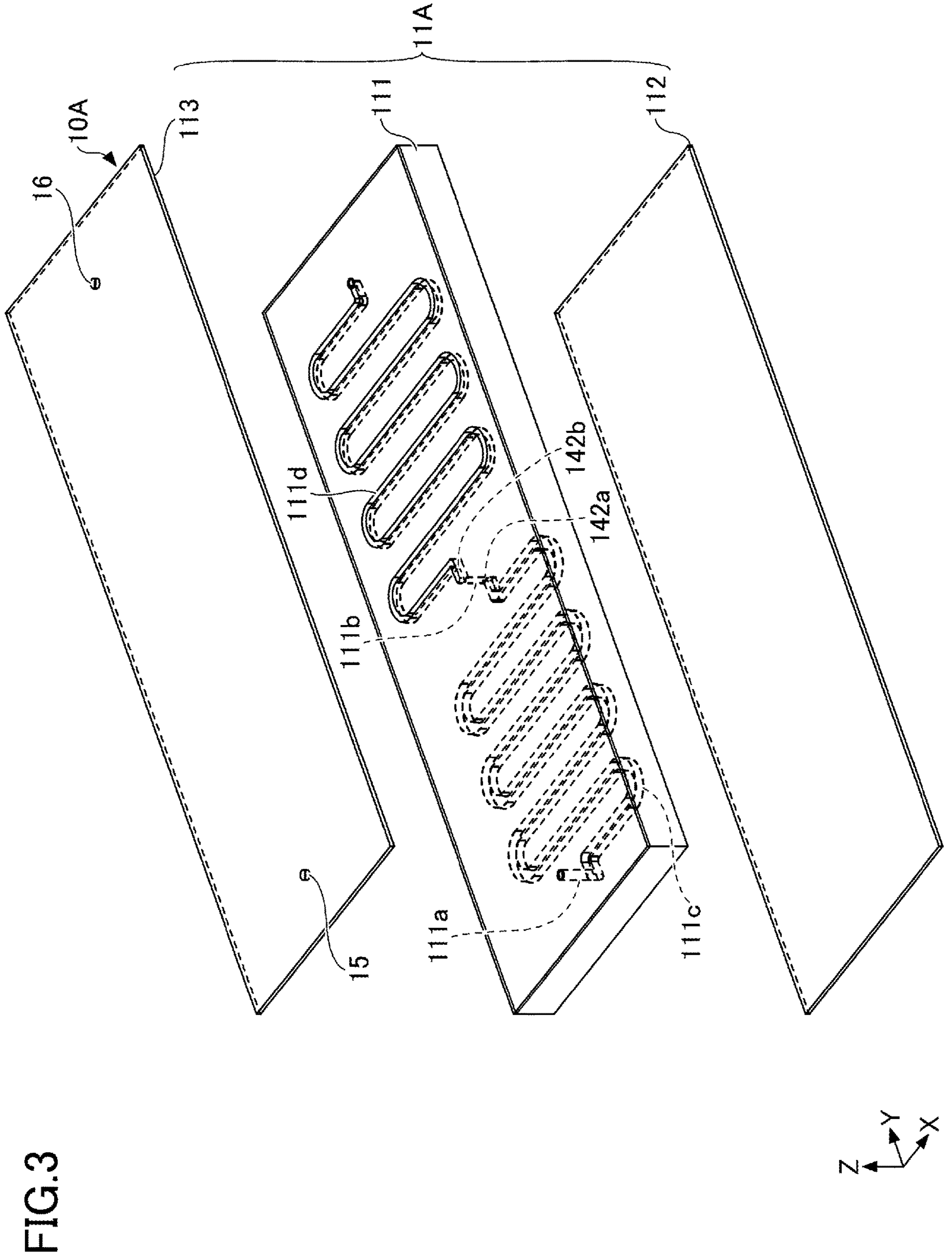
FIG. 3 is an exploded oblique view of a flow path plate for thermal cycle.
Figure 4:
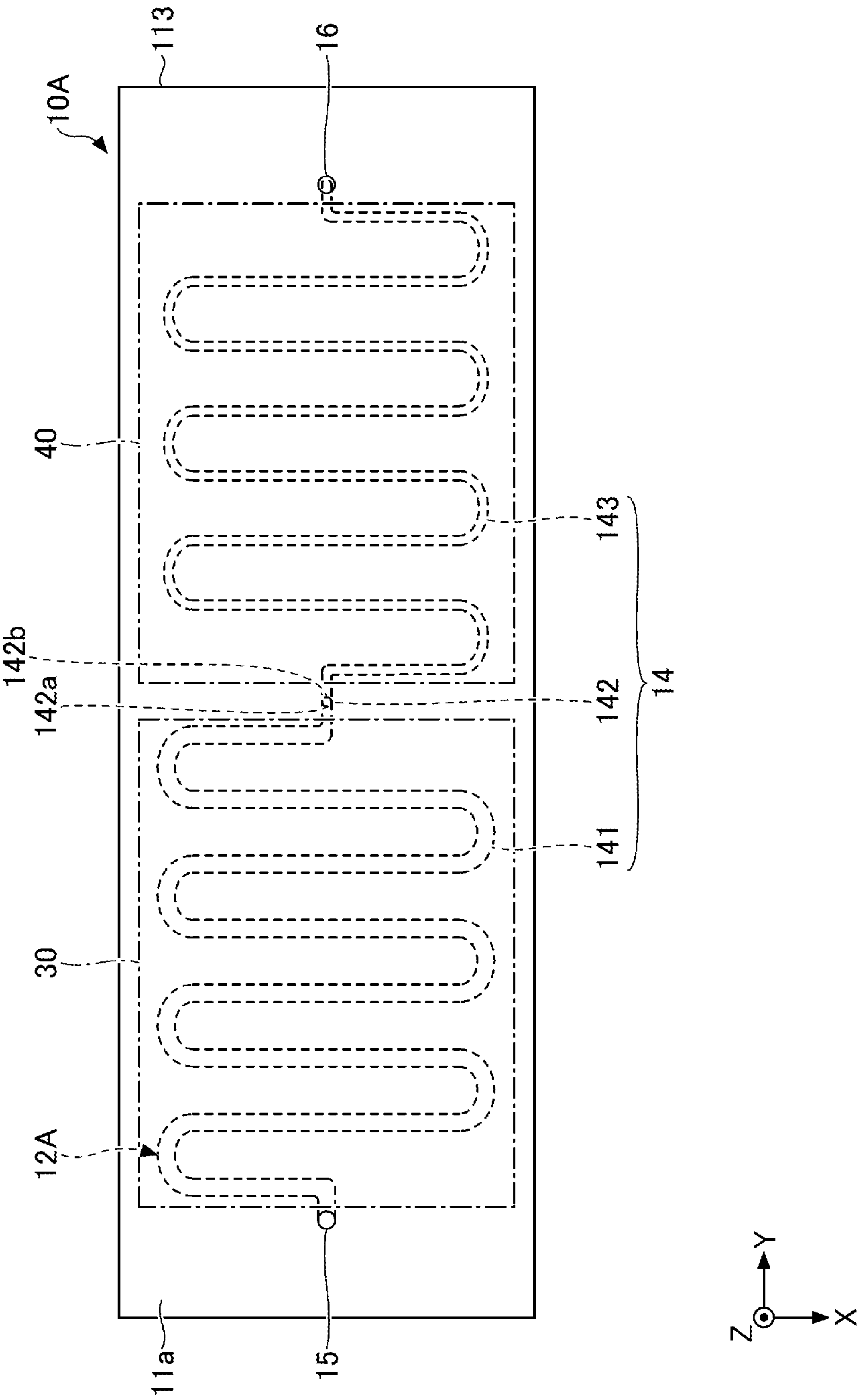
FIG. 4 is a plan view of a flow path plate for thermal cycle.

The flow path plate 10A for thermal cycle will be described. FIG. 2 is an oblique view of the flow path plate 10A for thermal cycle according to the first embodiment. FIG. 3 is an exploded oblique view of the flow path plate 10A for thermal cycle. FIG. 4 is a plan view of the flow path plate 10A for thermal cycle. As illustrated in FIG. 2 and FIG. 3, the flow path plate 10A for thermal cycle includes a plate-shaped member (plate main body) 11A formed in an approximately plate shape.

In FIG. 2 to FIG. 4, a three-dimensional orthogonal coordinates system in three axial directions (i.e., an X-axis direction, a Y-axis direction, and a Z-axis direction) is used, and the width direction of the flow path plate 10A for thermal cycle is defined as the X-axis direction, the length direction thereof is defined as the Y-axis direction, and the height (thickness) direction thereof is defined as the Z-axis direction. A direction to an upper side of the flow path plate 10A for thermal cycle from a lower side thereof is defined as the +Z-axis direction, and the opposite direction is defined as the −Z-axis direction. In the following description, the side of the flow path plate 10A for thermal cycle on one principal surface 11*a* thereof in the height direction may be described using such terms as upper, top, above, and the like, and the side on the other principal surface 11*b* thereof may be described using such terms as lower, down, under, below, beneath, and the like.

As illustrated in FIG. 4, the plate-shaped member 11A is formed in a rectangular shape in a plan view of the plate-shaped member 11A. The plate-shaped member 11A has light transmissivity. It is preferable that the plate-shaped member 11A has a good thermal conductivity, stability with respect to temperature changes, and permeation resistance against a sample. The plate-shaped member 11A is described as having light transmissivity when it has transmissivity to transmit measurement light therethrough when the measurement light is emitted from outside the plate-shaped member 11A. Examples of the measurement light include visible light (light having a wavelength of from 380 nm through 780 nm), ultraviolet light (light having a wavelength of from 10 nm through 400 nm), infrared light (light having a wavelength of from 750 nm through 1,000 μm), and the like.

As illustrated in FIG. 2 and FIG. 3, the plate-shaped member 11A includes a center base material 111, a lower thin plate member 112 situated on the lower side of the center base material 111, and an upper thin plate member 113 situated on the upper side of the center base material 111. The plate-shaped member 11A is a configured as a laminate of the center base material 111, the lower thin plate member 112, and the upper thin plate member 113 in the order of the lower thin plate member 112, the center base material 111, and the upper thin plate member 113 in the plate thickness direction.

The center base material 111, the lower thin plate member 112, and the upper thin plate member 113 may be made of a material through which the measurement light used for an analysis has a high transmittance. Examples of the material include olefin-based resins, acrylic-based resins, styrene-based resins, vinyl-based resins, fluorine-based resins, engineering plastics, super engineering plastics, thermosetting resins, glass, and the like. These materials may be used alone or in combination of two or more.

Examples of the olefin-based resins include: polyethylene resins such as polyethylene (PE), high-density polyethylene, low-density polyethylene, and the like; polypropylene resins such as polypropylene (PP), propylene-ethylene copolymers, and the like: cycloolefin-based resins such as cycloolefin polymers (COP), cycloolefin copolymers (COC), ethylene-cyclic olefin copolymers, and the like. Among these olefin-based resins, it is preferable to use cycloolefin-based resins in terms of ease of production, wideness of the range of wavelengths of light that can be transmitted, chemical resistance, and the like, and COPs and COCs are particularly preferable among cycloolefin-based resins.

The COPs are resins obtained by polymerizing a monomer component containing a cycloolefin monomer. The cycloolefin monomer that forms the COPs is not particularly limited, yet norbornene-based monomers are preferable. The norbornene-based monomers are not particularly limited so long as they have a norbornene ring. The COPs may contain any other monomer that is copolymerizable with the cycloolefin monomer in addition to the cycloolefin monomer. Examples of the any other monomer include straight-chained or branched alkene monomers, examples of which include α-olefins such as ethylene, propylene, 1-butene, isobutene, 1-hexene, and the like.

The COCs are copolymers in which two or more types of the cycloolefin monomers are combined.

An example of the acrylic-based resins is polymethyl methacrylate (PMMA).

Examples of the styrene-based resins include polystyrene (PS), acrylonitrile-styrene resins, and acrylonitrile-butadiene-styrene (ABS) resins.

Examples of the vinyl-based resins include polyvinyl chloride (PVC) resins, vinylidene chloride resins, polyacrylonitrile, polyvinyl acetate, acrylic acid copolymers, and polyvinyl alcohols.

Examples of the fluorine-based resins include polytetrafluoroethylene (PTFE), polychlorotrifluoroethylene (PCTFE), polyvinyl fluoride resins, and polyvinylidene fluoride.

Examples of the engineering plastics include: polycarbonate (PC) resins; polyacetal (POM) resins; polyester resins such as polyethylene terephthalate (PET), polybutylene terephthalate (PBT), polycyclohexylene dimethyl terephthalate, and the like; polyphenylene ether (PPE) resins; polyphenylene oxide; polyamide (PA) resins such as nylon 6, nylon 66, aromatic polyamides, and the like.

Examples of the super engineering plastics include polyphenylene sulfide (PPS) resins, polysulfone (PSF) resins, polyether sulfone (PES), polyether ether ketone (PEEK), polyallylate resins, aromatic polyester resins, polyimide (PI) resins, polyamide imide (PAI) resins, polyether imide (PEI) resins, and aramid resins.

Examples of the thermosetting resins include epoxy resins, silicone resins, phenol resins, unsaturated polyester resins, polyurethane resins, and the like.

As the center base material 111, the lower thin plate member 112, and the upper thin plate member 113, the materials specified above may be used alone or in combinations of two or more.

The center base material 111, the lower thin plate member 112, and the upper thin plate member 113 may be made of the same material, or may be made of different materials. In terms of inhibiting transmission of the measurement light to the outside halfway while passing through the flow path in the plate-shaped member 11A, the lower thin plate member 112 and the upper thin plate member 113 may be made of a material through which the measurement light used for an analysis has a high transmittance, and the center base material 111 may be made of a material through which the measurement light used for an analysis has a lower transmittance than through the lower thin plate member 112 and the upper thin plate member 113.

In this case, from among the materials specified above, a material through which the measurement light has a lower transmittance than through the material used to form the lower thin plate member 112 and the upper thin plate member 113 may be used as the material used to form the center base material 111. The center base material 111 needs only for the measurement light to have a lower transmittance therethrough than through the lower thin plate member 112 and the upper thin plate member 113, and it is preferable that the center base material 111 does not transmit the measurement light. The center base material 111 may be colored so as not to transmit the measurement light.

The materials used to form the center base material 111, the lower thin plate member 112, and the upper thin plate member 113 are appropriately selected in accordance with the wavelength of the measurement light used. For example, in a case of forming all of the center base material 111, the lower thin plate member 112, and the upper thin plate member 113 using COCs, a COC through which the measurement light has a lower transmittance than through the COCs used to form the lower thin plate member 112 and the upper thin plate member 113 is used as the COC used to form the center base material 111.

In a case of forming the center base material 111, the lower thin plate member 112, and the upper thin plate member 113 using olefin-based resins, acrylic-based resins, styrene-based resins, vinyl-based resins, fluorine-based resins, engineering plastics, super engineering plastics, or thermosetting resins from among the materials specified above, it is optional to obtain the members by molding resin materials containing these materials as a main component (a base resin).

The center base material 111, the lower thin plate member 112, and the upper thin plate member 113 may further contain one, or two or more selected from a group of reinforcing materials, release agents, antioxidants, and the like, as sub components. In a case of forming the center base material 111, the lower thin plate member 112, and the upper thin plate member 113 using COCs or COPs as super engineering plastics, it is possible to adjust the transmittance by adjusting the contents of any additives to be added in addition to COCs or COPs serving as the main component. Hence, by adjusting the amount of any additive to be used in the lower thin plate member 112 and the upper thin plate member 113 and the amount of any additive to be used in the center base material 111, it is possible to make the transmittance through the center base material 111 lower than the transmittance through the lower thin plate member 112 and the upper thin plate member 113.

The thickness of each of the center base material 111, the lower thin plate member 112, and the upper thin plate member 113 may be appropriately designed in accordance with the size of the plate-shaped member 11A and the like. For example, the thickness of the center base material 111 is preferably from 2 mm through 5 mm. When the thickness of the center base material 111 is from 2 mm through 5 mm, the plate-shaped member 11A can have a sufficient strength even when a groove is formed in the center base material 111.

The thickness of the upper thin plate member 113 is preferably from 0.1 mm through 0.2 mm. When the thickness of the upper thin plate member 113 is from 0.1 mm through 0.2 mm, the upper thin plate member 113 can easily conduct heat from the second temperature adjuster 40 to the interior of a cooling flow path 143, and can have a strength enough to stay unbroken when contacted by the second temperature adjuster 40.

The thickness of the lower thin plate member 112 is preferably from 0.1 mm through 0.2 mm. When the thickness of the lower thin plate member 112 is from 0.1 mm through 0.2 mm, the lower thin plate member 112 can easily conduct heat from the first temperature adjuster 30 to the interior of a heating flow path 141, and can have a strength enough to stay unbroken when contacted by the first temperature adjuster 30.

In a case where the center base material 111, the lower thin plate member 112, and the upper thin plate member 113 are made of, for example, a synthetic resin or glass, they may be joined by thermocompression bonding, or may be joined using an adhesive such as an ultraviolet curable resin and the like. In a case where the upper thin plate member 113 and the center base material 111 are made of glass, they may be joined using an adhesive.

As illustrated in FIG. 2, the plate-shaped member 11A includes a flow path (a fluid flow path) 12A through which a sample passes in the interior thereof.

As illustrated in FIG. 2, the flow path 12A includes a guiding flow path 13 and a micro flow path 14. The flow path 12A has an inlet opening 15 from which a sample is supplied, and an outlet opening 16 from which the sample is expelled in the +Z-axis direction principal surface 11*a* of the plate-shaped member 11A.

As illustrated in FIG. 3, holes and grooves that form a shape conforming to the flow path 12A are formed in the center base material 111.

As illustrated in FIG. 3, holes 111*a* and 111*b* in the center base material 111 are formed in an approximately circular shape when seen in a center line of the holes 111*a* and 111*b*. As illustrated in FIG. 3 and FIG. 4, the guiding flow path 13 and a part of the micro flow path 14 (a connecting flow path 142 described below) are formed in an approximately circular shape in the holes 111*a* and 111*b* in the center base material 111, respectively.

Figure 5:
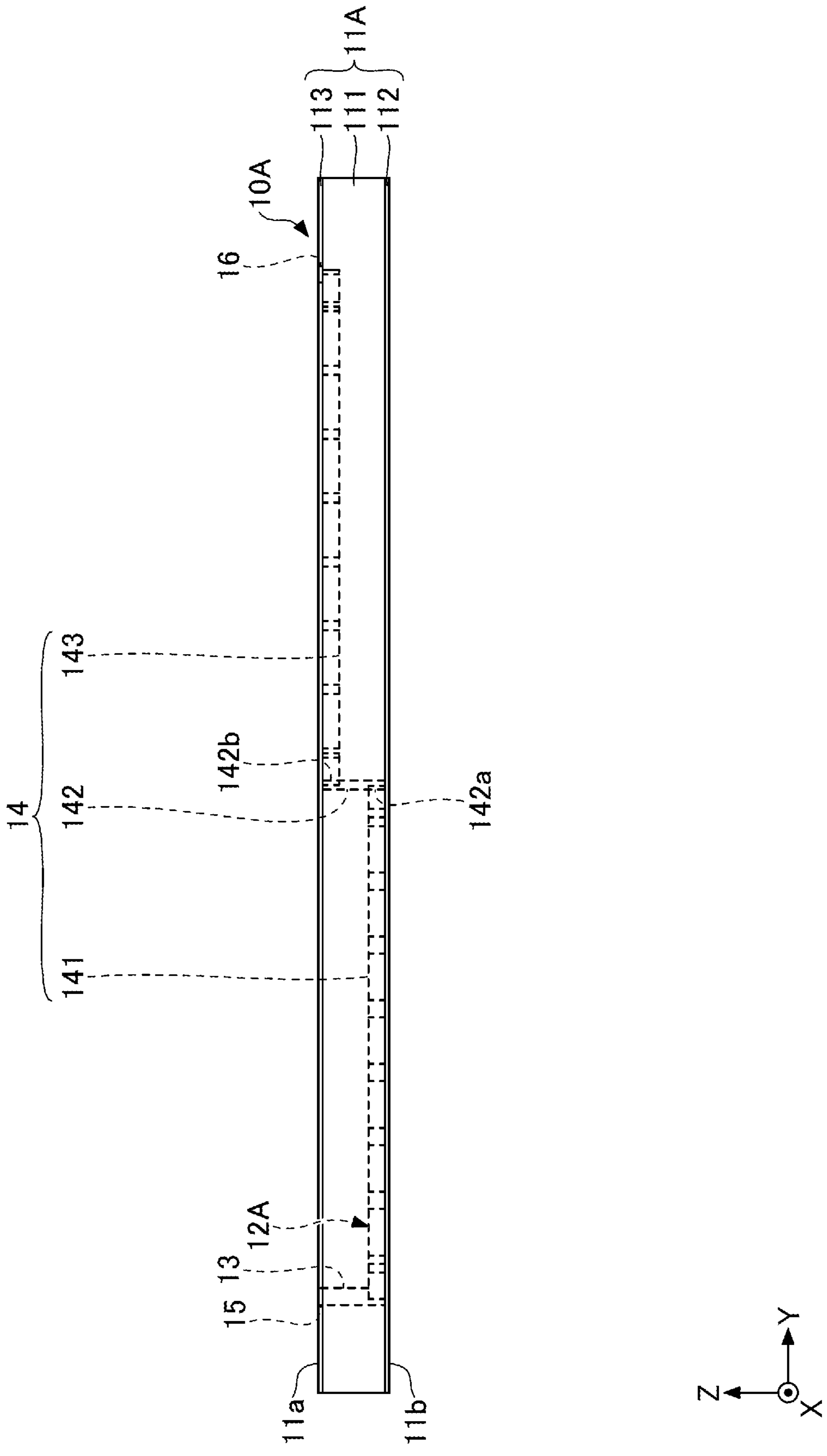
FIG. 5 is an arrow view along a line I-I of FIG. 2.

A lower groove 111*c* in the center base material 111 is formed in the lower surface of the center base material 111 as illustrated in FIG. 3, and is formed in an approximately rectangular shape when seen in a center line of the lower groove 111*c* as illustrated in FIG. 5. By the center base material 111 and the lower thin plate member 112 being pasted to each other, a part of the micro flow path 14 (the heating flow path 141 described below) is formed in the center base material 111. That is, a part of the micro flow path 14 (the heating flow path 141 described below) is formed on the center base material 111 side of the junction surface between the center base material 111 and the lower thin plate member 112.

An upper groove 111*d* in the center base material 111 is formed in the upper surface of the center base material 111 as illustrated in FIG. 3, and is formed in an approximately rectangular shape when seen in a center line of the upper groove 111*d* as illustrated in FIG. 5. By the center base material 111 and the upper thin plate member 113 being pasted to each other, a part of the micro flow path 14 (the cooling flow path 143 described below) is formed in the center base material 111. That is, a part of the micro flow path 14 (the cooling flow path 143 described below) is formed on the center base material 111 side of the junction surface between the center base material 111 and the upper thin plate member 113.

Figure 6:
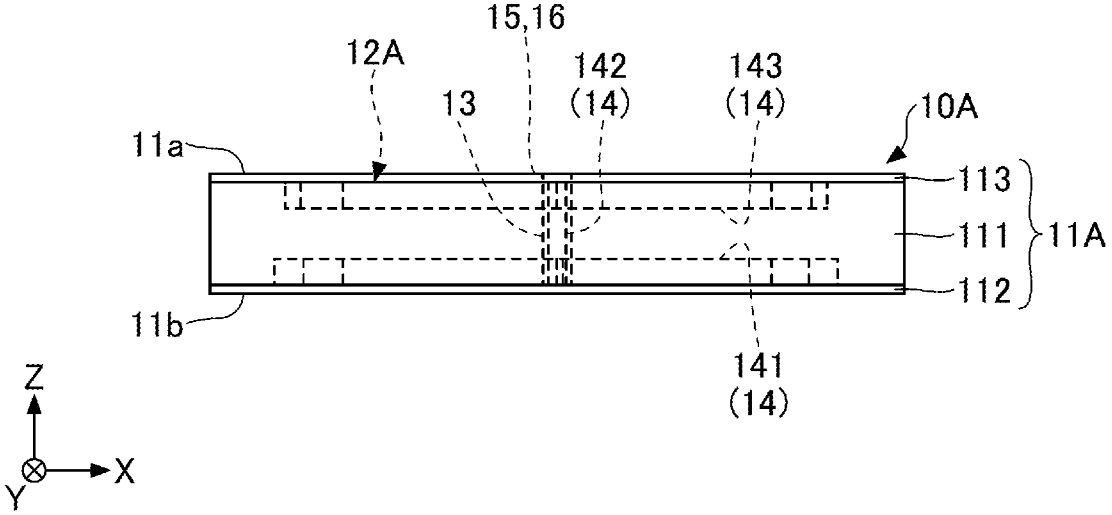
FIG. 6 is an arrow view along a line II-II of FIG. 2.

As illustrated in FIG. 3, holes having a shape conforming to the inlet opening 15 and the outlet opening 16 are formed in the upper thin plate member 113. As illustrated in FIG. 4, the holes in the upper thin plate member 113 are formed in an approximately circular shape when seen a center line of the holes. As illustrated in FIG. 5 and FIG. 6, the inlet opening 15 and the outlet opening 16 are formed in the upper thin plate member 113.

As illustrated in FIG. 4, the inlet opening 15 is situated near a −Y-axis direction-side side of the principal surface 11*a* of the plate-shaped member 11A in a plan view of the plate-shaped member 11A. The outlet opening 16 is situated near a +Y-axis direction-side side of the principal surface 11*a* of the plate-shaped member 11A in a plan view of the plate-shaped member 11A. The inlet opening 15 and the outlet opening 16 are each situated to have an approximately symmetrical shape with respect to a center line passing approximately the centers of the X-axis direction sides of the plate-shaped member 11A and parallel with the Y-axis direction sides of the plate-shaped member 11A (the Y-axis direction sides being orthogonal to the X-axis direction sides). The inlet opening 15 and the outlet opening 16 are formed in an approximately circular shape in a plan view of the plate-shaped member 11A.

The flow path 12A is formed as a result of the center base material 111, the lower thin plate member 112, and the upper thin plate member 113 being joined. In this way, the flow path 12A is formed in the interior of the plate-shaped member 11A as illustrated in FIG. 2, and functions as a passage for a sample to pass through the plate-shaped member 11A.

The diameter the guiding flow path 13 and the micro flow path 14 is designed to be, for example, from some nanometers through some hundreds of micrometers. The diameter (inner diameter) of the guiding flow path 13 and the micro flow path 14 is defined as the diameter of a hole that can be imaginarily regarded as a circle in a cross-section obtained by imaginarily cutting the guiding flow path 13 and the micro flow path 14 to pass a center of the guiding flow path 13 and the micro flow path 14 perpendicularly to their longer direction. When the guiding flow path 13 and the micro flow path 14 have a circular shape, the size of the diameter of the guiding flow path 13 and the micro flow path 14 is defined as the length of the diameter. When the guiding flow path 13 and the micro flow path 14 have an approximately rectangular shape, the size of the diameter is defined as the diameter of a circle when they are assumed as a circle that has the same area as the approximately rectangular shape.

As illustrated in FIG. 2 and FIG. 3, the guiding flow path 13 is formed in the center base material 111. The guiding flow path 13 is situated at a position corresponding to approximately the center of an X-axis direction side of the plate-shaped member 11A near the −Y-axis direction-side shorter side of the plate-shaped member 11A. As illustrated in FIG. 2, the guiding flow path 13 joins the inlet opening 15 and the micro flow path 14 to each other. The guiding flow path 13 is formed in the thickness direction (−Z-axis direction) of the plate-shaped member 11A approximately perpendicularly to the inlet opening 15. The guiding flow path 13 extends from the inlet opening 15 in the −Z-axis direction to the boundary between the center base material 111 and the lower thin plate member 112 and is joined to the micro flow path 14.

It is preferable that a cross-section of the guiding flow path 13 is formed to be larger than a cross-section of the micro flow path 14. When suppling a sample, a supply tube for supplying the sample is inserted into the inlet opening 15 of the guiding flow path 13. Hence, the supply tube can be easily inserted into the guiding flow path 13 when the cross-section of the guiding flow path 13 is formed to be larger.

As illustrated in FIG. 2 and FIG. 3, the micro flow path 14 is formed in the center base material 111, and is formed as a result of the center base material 111, the lower thin plate member 112, and the upper thin plate member 113 being pasted to each other.

As illustrated in FIG. 2, the micro flow path 14 is a flow path that joins the guiding flow path 13 and the outlet opening 16 to each other, and is configured to heat a sample flowing from the guiding flow path 13. The micro flow path 14 includes the heating flow path 141, the connecting flow path 142, and the cooling flow path 143.

As illustrated in FIG. 2, the heating flow path 141 is joined to the side surface of the guiding flow path 13, and extends in a horizontal direction in the plate-shaped member 11A. The heating flow path 141 is constituted by a space enclosed by the lower groove 111*c* formed in the lower surface of the center base material 111, and by the lower thin plate member 112. The heating flow path 141 is formed in a bellows-like shape extending in the X-axis direction while going back and forth three times in a plan view of the plate-shaped member 11A.

That is, as illustrated in FIG. 2 and FIG. 4, the heating flow path 141 includes a plurality of straight-line portions arranged in parallel with each other with intervals secured in the length direction (Y-axis direction) of the plate-shaped member 11A, and curved portions formed in an approximately U-letter shape and joining adjoining straight-line portions. The curved portions join the ends of adjoining straight-line portions on one end side (in the +X-axis direction) to each other or the ends thereof on the other end side (in the −X-axis direction) to each other. Being formed of the straight-line portions and the curved portions to be curved in a U-letter shape a plurality of times (seven times in FIG. 2) in the length direction (Y-axis direction) of the plate-shaped member 11A, the heating flow path 141 forms a flow path through which a sample flows in a meandering manner. The number of times the heating flow path 141 is curved is not particularly limited, may be appropriately set in accordance with the size of the plate-shaped member 11A and the like, and needs only to be once or more.

A cross-section of the heating flow path 141 is formed in an approximately rectangular shape when seen in a direction orthogonal to the flow of a sample.

The connecting flow path 142 is formed to penetrate the center base material 111 such that light can be transmitted in the upper-lower direction of the plate-shaped member 11A, and connects the heating flow path 141 and the cooling flow path 143 to each other. The connecting flow path 142 is a space that is constituted by a hole 111*b* formed in the principal surfaces of the center base material 111, and through which the lower groove 111*c* and the upper groove 111*d* communicate with each other. The connecting flow path 142 is a space into which the measurement light is emitted, and can be used as a flow path for optical detection. As illustrated in FIG. 5 and FIG. 6, the connecting flow path 142 is provided vertically in a portion of the flow path 12A (between the heating flow path 141 and the cooling flow path 143). The connecting flow path 142 is provided in the center base material 111 of the plate-shaped member 11A in the Z-axis direction of the plate-shaped member 11A. With the center base material 111 sandwiched between the lower thin plate member 112 and the upper thin plate member 113, the connecting flow path 142 is formed by the junction surfaces between the hole 111*b* in the center base material 111 and each of the lower thin plate member 112 and the upper thin plate member 113.

The connecting flow path 142 is formed in a circular shape when seen in the axial direction thereof as illustrated in FIG. 4, and is formed in a rectangular shape when seen in a side view of the plate-shaped member 11A as illustrated in FIG. 5.

The connecting flow path 142 is formed in a size through which a reagent and the measurement light can pass when seen in the axial direction thereof, and has a cross-sectional area approximately equal to or smaller than the heating flow path 141 and the cooling flow path 143 when seen in the axial direction thereof as illustrated in FIG. 4. The size of the connecting flow path 142 in the axial direction may be appropriately set in accordance with the amount of the reagent used for testing, the concentration of a component contained in the reagent, and the like. It is possible to set the size of the connecting flow path 142 in the axial direction, by adjusting the size of the hole 111*b*. The hole 111*b* needs only to be formed in a size through which the reagent and the measurement light can pass, and the cross-sectional shape is not limited to a circular shape and may be, for example, a polygonal shape such as a quadrangular shape and the like.

As illustrated in FIG. 5, the connecting flow path 142 has an internal wall orthogonal to the incidence direction of the measurement light, and has an inlet opening 142*a* of a liquid and an outlet opening 142*b* of a liquid in the internal wall. As illustrated in FIG. 5, the inlet opening 142*a* is positioned in an end surface of the connecting flow path 142 on the −Y-axis direction side, and the outlet opening 142*b* is positioned in an end surface of the connecting flow path 142 on the +Y-axis direction side. In the present embodiment, as illustrated in FIG. 5, the connecting flow path 142 is joined to the heating flow path 141 via the internal surface of the connecting flow path 142 on the −Y-axis direction side, and is joined to the cooling flow path 143 via the internal surface of the connecting flow path 142 on the +Y-axis direction side in a side view of the flow path plate 10A for thermal cycle.

As illustrated in FIG. 2 and FIG. 5, the cooling flow path 143 extends in a horizontal direction of the plate-shaped member 11A by joining the connecting flow path 142 and the outlet opening 16 to each other. The cooling flow path 143 is constituted by a space enclosed by the upper groove 111*d* formed in the upper surface of the center base material 111 and by the upper thin plate member 113. The cooling flow path 143 is formed in a bellows-like shape extending in the X-axis direction while going back and forth three times in a plan view of the plate-shaped member 11A.

That is, as illustrated in FIG. 2 and FIG. 4, the cooling flow path 143 includes a plurality of straight-line portions arranged in parallel with each other with intervals secured in the length direction (Y-axis direction) of the plate-shaped member 11A, and curved portions formed in an approximately U-letter shape and joining adjoining straight-line portions, like the heating flow path 141. The details of the straight-line portions and the curved portions will be omitted, because they have the same configuration as that in the heating flow path 141. Being formed of the straight-line portions and the curved portions to be curved in a U-letter shape a plurality of times (seven times in FIG. 2) in the length direction (Y-axis direction) of the plate-shaped member 11A, the cooling flow path 143 forms a flow path through which a sample flows in a meandering manner.

A cross-section of the cooling flow path 143 is formed in an approximately rectangular shape when seen in a direction orthogonal to the flow of a sample, like the heating flow path 141.

The plate-shaped member 11A has a heating-target surface contacted by the first temperature adjuster 30 configured to heat the heating flow path 141, and a cooling-target surface contacted by the second temperature adjuster 40 configured to cool the cooling flow path 143 at a temperature lower than that by the first temperature adjuster 30.

The heating-target surface is the principal surface (lower surface) 11*b* of the plate-shaped member 11A, and is positioned under the heating flow path 141. The cooling-target surface is the principal surface (upper surface) 11*a* of the plate-shaped member 11A, and is positioned above the cooling flow path 143.

Next, an example of the method for producing the flow path plate 10A for thermal cycle will be described. First, a groove or holes that constitute(s) the flow path 12A, or the inlet opening 15 and the outlet opening 16 of the flow path plate 10A for thermal cycle are formed in the junction surface sides of two plates from among three rectangular plates. As a result, the center base material 111 and the upper thin plate member 113 are obtained. The remaining one plate is used as the lower thin plate member 112.

The groove and the holes between the center base material 111 and the upper thin plate member 113 may be formed when molding the center base material 111 and the upper thin plate member 113 by injection molding, transfer molding, or the like, or may be machining-formed by mechanical machining, a laser, or the like. Alternatively, the groove may be formed in the surfaces of the center base material 111 and the upper thin plate member 113 by press machining or the like.

Next, the junction surfaces of the center base material 111 are sandwiched between the lower thin plate member 112 and the upper thin plate member 113, and these members are overlaid on each other such that the members are not misaligned. Subsequently, the center base material 111, the lower thin plate member 112, and the upper thin plate member 113 are joined integrally by, for example, heating and welding (thermocompression bonding) or the like. For example, an adhesive is applied to the center base material 111, the lower thin plate member 112, and the upper thin plate member 113 on portions other than the portions corresponding to the grooves and the holes, and then the members are pasted to each other and joined integrally. In this way, the flow path plate 10A for thermal cycle illustrated in FIG. 2 is obtained.

(Conveying Member)

As illustrated in FIG. 1, the conveying member 20 is a device configured to convey a sample from a sample storage 21 to the flow path plate 10A for thermal cycle, and to convey the sample from the heating flow path 141 to the cooling flow path 143 in the flow path plate 10A for thermal cycle. As the conveying member 20, a pressure feeding pump or the like is used.

(First Temperature Adjuster)

As illustrated in FIG. 1, the first temperature adjuster 30 is situated to contact the heating-target surface (principal surface 11*b*) of the plate-shaped member 11A. As illustrated in FIG. 2 and FIG. 4, the first temperature adjuster 30 is situated in a region in which the heating flow path 141 is positioned in the heating-target surface of the plate-shaped member 11A in a plan view. The first temperature adjuster 30 functions as a heating element configured to heat the heating flow path 141 via the heating-target surface.

The first temperature adjuster 30 needs only to be able to heat the plate-shaped member 11A. As the first temperature adjuster 30, a common heating device such as a hot plate, an aluminum block heater, and the like may be used.

The first temperature adjuster 30 can appropriately heat the heating flow path 141 to a desirably selected temperature in accordance with the type of a sample, and the temperature is preferably, for example, from 85° C. through 98° C., and particularly preferably around 94° C. In a case where a sample is an analyte obtained by mixing a DNA and a PCR reagent, a double-stranded DNA can be separated into single-stranded DNA in the specified temperature range.

There is a case where the first temperature adjuster 30 cannot conduct heat sufficiently to a sample when heating the sample in the heating flow path 141. Hence, the setting temperature of the first temperature adjuster 30 may be set to be higher by some degrees Celsius (e.g., by from 2° C. through 3° C.) in accordance with the temperature of the sample.

The installation area of the first temperature adjuster 30 needs only to be in a range in which the heating flow path 141 is included in a plan view of the plate-shaped member 11A.

The thermal cycle device 1A may include a non-illustrated temperature sensor or the like on the heating-target surface (principal surface 11*b*) of the plate-shaped member 11A, and may control the temperature of the heating flow path 141.

(Second Temperature Adjuster)

As illustrated in FIG. 1, the second temperature adjuster 40 is situated to contact the cooling-target surface (principal surface 11*a*) of the plate-shaped member 11A. As illustrated in FIG. 2 and FIG. 4, the second temperature adjuster 40 is situated in a region in which the cooling flow path 143 is positioned in the cooling-target surface of the plate-shaped member 11A in a plan view. The second temperature adjuster 40 functions as a cooling element configured to cool the cooling flow path 143 via the cooling-target surface. The second temperature adjuster 40 lowers the temperature of a sample heated by the first temperature adjuster 30 through the heating flow path 141.

The second temperature adjuster 40 needs only to be able to cool the sample heated through the heating flow path 141. As the second temperature adjuster 40, a common heating device such as a heater and the like, or a cooling device may be used.

The second temperature adjuster 40 can appropriately cool the cooling flow path 143 to a desirably selected temperature in accordance with the type of a sample, and the temperature is preferably, for example, from 55° C. through 65° C., and particularly preferably around 60° C. In a case where a sample is an analyte obtained by mixing a DNA and a PCR reagent, the amplification reaction of the DNA contained in the sample can be promoted in the specified temperature range through annealing of single-stranded DNA and the PCR reagent and elongation of the DNA.

There is a case where the second temperature adjuster 40 cannot absorb heat sufficiently from a sample when cooling the sample in the cooling flow path 143. Hence, the setting temperature of the second temperature adjuster 40 may be set to be lower by some degrees Celsius (e.g., by from 2° C. through 3° C.) in accordance with the temperature of the sample.

The installation area of the second temperature adjuster 40 needs only to be in a range in which the cooling flow path 143 is included in a plan view of the plate-shaped member 11A.

The thermal cycle device 1A may include a non-illustrated temperature sensor or the like on the cooling-target surface of the plate-shaped member 11A, and may control the temperature of the cooling flow path 143.

(Light-Emitting Member)

As illustrated in FIG. 1, the light-emitting member 50 is configured to emit the measurement light into the connecting flow path 142 of the flow path plate 10A for thermal cycle. As the light-emitting member 50, for example, a publicly-known light source such as a LED, a tungsten lamp, a laser, and the like may be used.

(Light-Receiving Member)

As illustrated in FIG. 1, the light-receiving member 60 is configured to receive and detect the measurement light that has been emitted from the light-emitting member 50 and has passed through the connecting flow path 142 in the flow path plate 10A for thermal cycle. The light-receiving member 60 is situated to be opposed to the light-emitting member 50 through the connecting flow path 142 such that the light axis of the measurement light emitted from the light-emitting member 50 and the light axis of the measurement light to be received by the light-receiving member 60 are on approximately the same straight line.

The light-receiving member 60 needs only to be able to detect the measurement light, and a publicly-known detector may be used. The light-receiving member 60 is connected to the control unit 70 through a wiring 61.

(Control Unit)

As illustrated in FIG. 1, the control unit 70 is configured to analyze a liquid that has passed through the connecting flow path 142 of the flow path plate 10A for thermal cycle based on the detection result of the measurement light detected by the light-receiving member 60. The control unit 70 sends the analysis result to the display unit 80.

(Display Unit)

As illustrated in FIG. 1, the display unit 80 is configured to display the analysis result sent from the control unit 70. As the display unit 80, a monitor or the like may be used.

An example of how to use the thermal cycle device 1A according to the present embodiment will be described.

In response to the flow path plate 10A for thermal cycle being inserted into the device main body of the thermal cycle device 1A, the flow path plate 10A for thermal cycle is positionally fixed in the device main body. Subsequently, as illustrated in FIG. 1, the supply tube 91 for supplying a sample is automatically inserted into the inlet opening 15, and an expelling tube 92 for expelling a sample is automatically inserted into the outlet opening 16. Subsequently, a sample is injected from the supply tube 91 into the inlet opening 15. Instead of the supply tube 91, a dropper, a syringe, or the like may be used to supply a sample into the inlet opening 15.

The conveying member 20 pressure-feeds a sample in the sample storage 21, to be supplied into the inlet opening 15 through the supply tube 91. As illustrated in FIG. 2, the sample injected into the inlet opening 15 flows from the inlet opening 15 in the thickness direction (−Z-axis direction) of the flow path plate 10A for thermal cycle through the guiding flow path 13, and then flows from the guiding flow path 13 into the heating flow path 141 formed in the lower surface of the center base material 111.

The sample that flows through the heating flow path 141 is heated to a high temperature (e.g., 94° C.) by the first temperature adjuster 30 while passing through the heating flow path 141 (thermal denaturation). By the sample in the heating flow path 141 being heated, double-stranded DNA contained in the sample is separated into single-stranded DNA.

Figure 7:
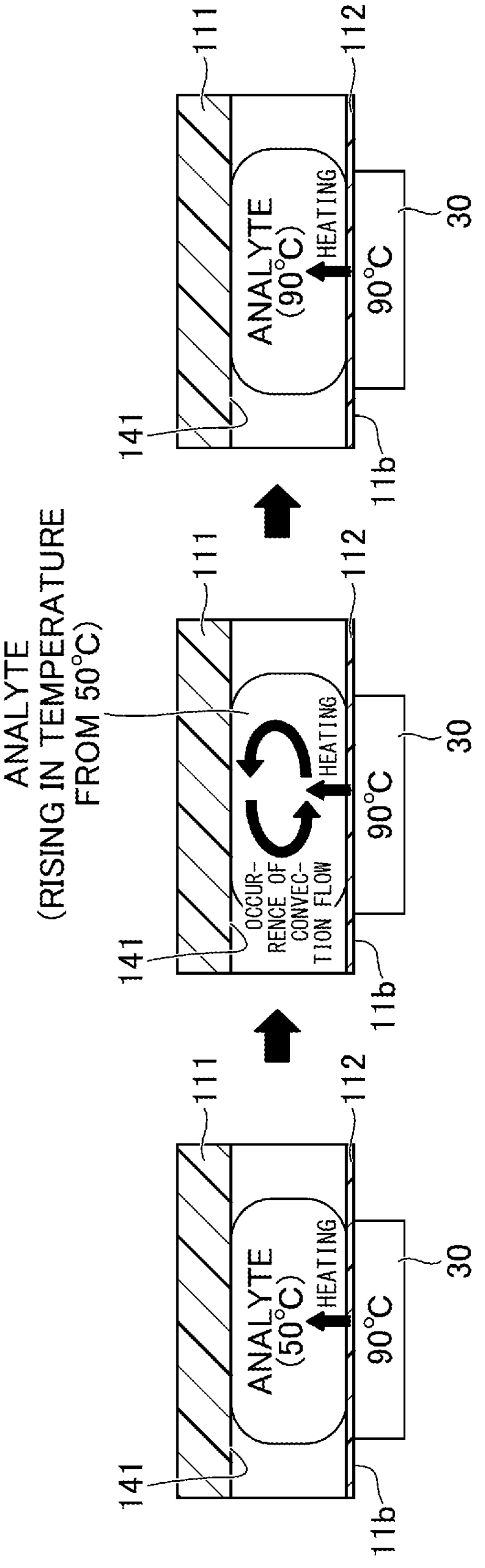
FIG. 7 is a drawing illustrating a state in which a sample is heated by a first temperature adjuster to cause a convection flow.

Here, the sample flowing through the heating flow path 141 is heated from under. Hence, the sample positioned at a lower side in the heating flow path 141 is rapidly heated to a high temperature, and the sample positioned at an upper side in the heating flow path 141 is slowly heated to a high temperature. Hence, as illustrated in FIG. 7, the sample positioned at the lower side in the heating flow path 141 moves to the upper side, and the sample positioned at the upper side in the heating flow path 141 moves to the lower side, readily causing a convection flow of the sample flowing through the heating flow path 141. Hence, the sample flowing through the heating flow path 141 can be easily heated to a high temperature owing to the convection flow thereof.

The conveying speed of the sample flowing through the heating flow path 141 may be adjusted such that the sample is heated to a predetermined temperature (e.g., 94° C.).

As the period of time for which the sample flows through the heating flow path 141, it is preferable to retain the sample at the predetermined temperature (e.g., 94° C.) for from 20 seconds through 2 minutes after the sample has reached the predetermined temperature (e.g., 94° C.).

The sample having passed throughout the heating flow path 141 is supplied into the connecting flow path 142. The sample flows in the thickness direction (+Z-axis direction) of the flow path plate 10A for thermal cycle by passing through the connecting flow path 142.

Before the sample comes flowing through the connecting flow path 142 or in a state in which the sample is flowing through the connecting flow path 142, the measurement light is emitted from the light-emitting member 50 into the connecting flow path 142 such that the measurement light passes through the connecting flow path 142. The light emitted from the light-emitting member 50 passes through the connecting flow path 142, and is then received and detected by the light-receiving member 60. As a result, the components in the sample that has passed through the connecting flow path 142 become ready to be analyzed. As the measurement light, visible light, ultraviolet light, infrared light, and the like may be used.

The detection result detected by the light-receiving member 60 is sent to the control unit 70 through the wiring 61, and the control unit 70 analyzes each component in the sample that has passed through the connecting flow path 142. The control unit 70 sends the analysis result to the display unit 80, and the analysis result is displayed on the display unit 80. From the displayed result on the display unit 80, it is possible to confirm that the sample has passed through the connecting flow path 142 from the heating flow path 141.

After having passed through the connecting flow path 142, the sample from the connecting flow path 142 flows through the cooling flow path 143 formed in the upper surface of the center base material 111.

The sample flowing through the cooling flow path 143 is cooled to a low temperature (e.g., 60° C.) by the second temperature adjuster 40 (annealing and elongation). By the sample in the cooling flow path 143 being cooled, the amplification reaction of the DNA contained in the sample is promoted through annealing of single-stranded DNA and the primer contained in the sample and elongation of the DNA.

Figure 8:
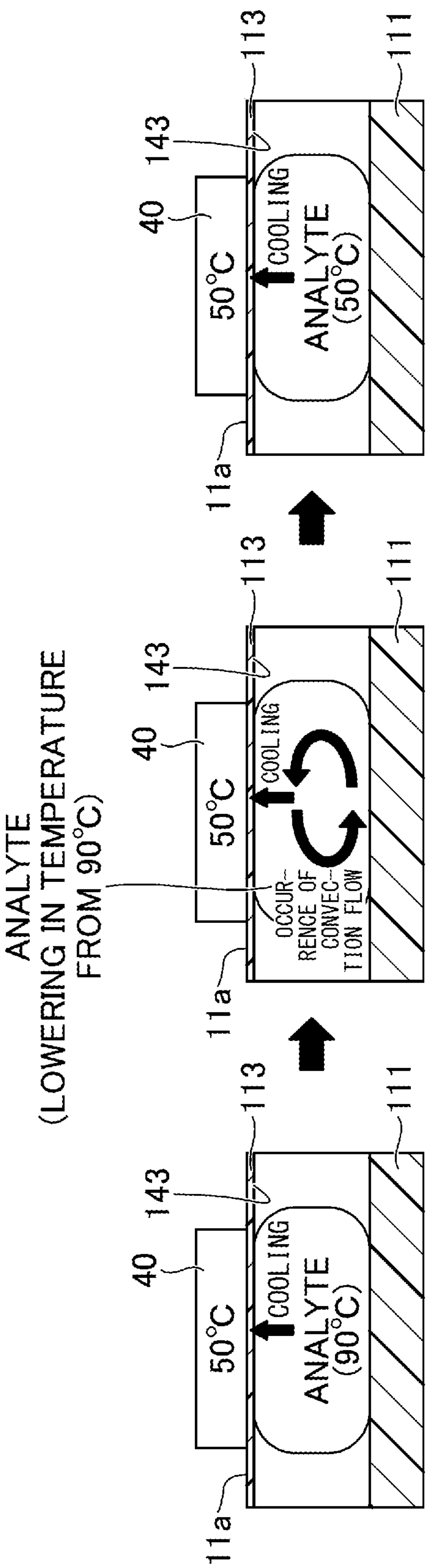
FIG. 8 is a drawing illustrating a state in which a sample is cooled by a second temperature adjuster to cause a convection flow.

Here, the sample flowing through the cooling flow path 143 is cooled from above in the cooling flow path 143. Hence, the sample positioned at an upper side in the cooling flow path 143 is rapidly cooled to a low temperature, and the sample positioned at a lower side in the cooling flow path 143 is slowly cooled to a low temperature. Hence, as illustrated in FIG. 8, the sample positioned at the upper side in the cooling flow path 143 moves to the lower side, and the sample positioned at the lower side in the cooling flow path 143 moves to the upper side, readily causing a convection flow of the sample flowing through the cooling flow path 143. Hence, the sample flowing through the cooling flow path 143 can be easily cooled to a low temperature owing to the convection flow thereof.

The sample passing through the cooling flow path 143 is expelled into the expelling tube 92 from the outlet opening 16. The sample expelled into the expelling tube 92 from the outlet opening 16 is analyzed (observed) by the control unit 70.

The sample supplied into the flow path 12A may be moved to the heating flow path 141 and to the cooling flow path 143 in the micro flow path 14 in an alternating manner back and forth a plurality of times, to form a thermal cycle in the plate-shaped member 11A. For example, by being pressure-fed and suctioned by the conveying member 20, the sample can be moved between the heating flow path 141 and the cooling flow path 143 in the micro flow path 14 in an alternating manner back and forth a plurality of times. After the sample is pressure-fed by the conveying member 20 to be moved from the heating flow path 141 to the cooling flow path 143, the sample is then suctioned by the conveying member 20 to be moved from the cooling flow path 143 to the heating flow path 141. By moving the sample supplied into the flow path 12A to the heating flow path 141 and to the cooling flow path 143 in the micro flow path 14 in an alternating manner back and forth a plurality of times, it is possible to reliably promote the nucleic acid amplification reaction, particularly, PCR of the sample.

The number of times to move the sample in the flow path 12A back and forth between the heating flow path 141 and the cooling flow path 143 is appropriately determined in accordance with the combination of the target nucleic acid, the primer, the enzyme, and the like.

Hence, the flow path plate 10A for thermal cycle according to the present embodiment includes the plate-shaped member 11A, the heating flow path 141, the connecting flow path 142, the cooling flow path 143, the heating-target surface (principal surface 11*b*), and the cooling-target surface (principal surface 11*a*), with the heating-target surface situated under the heating flow path 141 and the cooling-target surface situated above the cooling flow path 143. The flow path plate 10A for thermal cycle can easily make the sample temperature uniform, because it can induce a convection flow of the sample in the heating flow path 141 and in the cooling flow path 143 both when the sample is heated by the first temperature adjuster 30 in the heating flow path 141 and when the sample is cooled by the second temperature adjuster 40 in the cooling flow path 143. The flow path plate 10A for thermal cycle can shorten the sample processing time in the heating flow path 141 and the cooling flow path 143, because it can shorten the time taken until the temperature distribution in the heating flow path 141 and the cooling flow path 143 becomes uniform.

The flow path plate 10A for thermal cycle can inhibit variation in the temperature of the reagent while being heated, because it can heat the reagent to a uniform temperature in the heating flow path 141. Hence, the flow path plate 10A for thermal cycle can inhibit what is generally referred to as an overshoot, in which the heating temperature rises to equal to or higher than the setting temperature, from occurring while the reagent is heated in the heating flow path 141. Raising the temperature of the reagent by setting the heating temperature to be higher than a predetermined temperature in order to shorten the time taken to raise the temperature of the reagent is likely to cause variation in the temperature of the reagent, inclining to an overshoot in which the reagent becomes equal to or higher than the setting temperature. The flow path plate 10A for thermal cycle can inhibit an overshoot, because it can heat the reagent to a uniform temperature in the heating flow path 141, keeping the reagent from becoming equal to or higher than the setting temperature.

In the flow path plate 10A for thermal cycle, the plate-shaped member 11A may be formed of the center base material 111, the lower thin plate member 112, and the upper thin plate member 113, the heating flow path 141 may be constituted by a space enclosed by the lower groove 111*c* in the center base material 111 and by the lower thin plate member 112, the cooling flow path 143 may be constituted by a space enclosed by the upper groove 111*d* formed in the upper surface of the center base material 111 and by the upper thin plate member 113, and the connecting flow path 142 may be constituted by a space through which the lower groove 111*c* and the upper groove 111*d* communicate with each other. The lower thin plate member 112 and the upper thin plate member 113 both having a small thickness can increase the thermal transfer efficiency. The flow path plate 10A for thermal cycle can further shorten the sample processing time in the heating flow path 141 and the cooling flow path 143, because it can increase the sample heating or cooling efficiency in the heating flow path 141 and the cooling flow path 143 via the lower thin plate member 112 and the upper thin plate member 113.

In the flow path plate 10A for thermal cycle, the lower thin plate member 112 and the upper thin plate member 113 may be made of a material having light transmissivity, and the connecting flow path 142 may be formed to penetrate the center base material 111 in the upper-lower direction of the plate-shaped member 11A. Hence, the flow path plate 10A for thermal cycle can inhibit the measurement light, which comes incident into the connecting flow path 142 through the upper thin plate member 113, from being transmitted to outside the connecting flow path 142 when passing through the center base material 111, making it possible to increase the detection amount of the measurement light to go outside through the lower thin plate member 112. With the flow path plate 10A for thermal cycle, it is possible to perform a high-accuracy optical detection by detecting the measurement light that is to go outside through the lower thin plate member 112.

In a case where a sample contains a nucleic acid, the flow path plate 10A for thermal cycle can induce the nucleic acid amplification reaction in the flow path 12A including the heating flow path 141 and the cooling flow path 143. Hence, the flow path plate 10A for thermal cycle can be effectively used as an analysis plate in which PCR or the like is induced.

The thermal cycle device 1A according to the present embodiment includes the flow path plate 10A for thermal cycle, the conveying member 20 the micro flow path 14, the first temperature adjuster 30, and the second temperature adjuster 40, wherein the micro flow path 14 includes the heating flow path 141, the connecting flow path 142, and the cooling flow path 143, the first temperature adjuster 30 is situated under the heating flow path 141, and the second temperature adjuster 40 is situated above the cooling flow path 143. The thermal cycle device 1A can induce a convection flow of a reagent through heating or cooling in the flow path 12A both when heating a sample in the heating flow path 141 by the first temperature adjuster 30 and when cooling the sample in the cooling flow path 143 by the second temperature adjuster 40. Hence, the thermal cycle device 1A can shorten the sample processing time in the flow path 12A, because it can shorten the time taken until the temperature distribution in the flow path 12A becomes uniform.

The flow path plate 10A for thermal cycle and the thermal cycle device 1A according to the present embodiment, which can shorten the sample processing time as described above, can be effectively used for the nucleic acid amplification reaction such as PCR and the like. The nucleic acid amplification reaction can be effectively used in a method for keeping track of gene expression patterns in cells that are being in unusual states such as iPS cells, ES cells, cancer cells, and the like, for identifying pathogens, and for inspecting the gene polymorphism (SNP) of living organisms, a method for inspecting the amount of expression of a gene introduced into a cell, and the like. Moreover, the nucleic acid amplification reaction, which can amplify a trace nucleic acid to a quantity in which the nucleic acid can be visually precepted, is also useful for very small quantity detection of microorganisms, and can be effectively used in a method for quick detection of microorganisms and the like. Furthermore, the nucleic acid amplification reaction, which can amplify a complementary DNA (cDNA) transformed from RNA with a reverse transcriptase, can be effectively used for small quantity detection of RNA, and the like.

The flow path plate 10A for thermal cycle and the thermal cycle device 1A according to the present embodiment, which can shorten the processing time taken to promote the nucleic acid amplification reaction such as PCR and the like, can easily increase the accuracy of analyses and the like of trace substances such as blood components including proteins and nucleic acids contained in the blood. Hence, the flow path plate 10A for thermal cycle and the thermal cycle device 1A can be suitably used for, for example, genetic testing such as medical testing, identification of agricultural produce and pathogenic microorganisms, food safety evaluation, pathogenic virus and infectious disease testing, and the like.

(Modified Example)

A modified example of the thermal cycle device 1A will be described.

In the present embodiment, the thermal cycle device 1A may include a non-illustrated first pressure feeder connected to the inlet opening 15, and a non-illustrated second pressure feeder (e.g., a pressurizing pump or the like) connected to the outlet opening 16. In this case, after a sample is introduced into the inlet opening 15, a first nozzle connected to the non-illustrated first pressure feeder (e.g., a pressurizing pump or the like) is connected to the inlet opening 15 with the supply tube 91 removed from the plate-shaped member 11A, and a second nozzle connected to the non-illustrated second pressure feeder (e.g., a pressurizing pump or the like) is connected to the outlet opening 16. Then, the non-illustrated first pressure feeder is actuated to supply air into the flow path 12A from the non-illustrated first pressure feeder to move the sample from the heating flow path 141 to the cooling flow path 143, followed by the non-illustrated first pressure feeder being stopped and the non-illustrated second pressure feeder being actuated to supply air into the flow path 12A from the non-illustrated second pressure feeder, to move the sample from the cooling flow path 143 to the heating flow path 141. In this way, the flow path plate 10A for thermal cycle can reliably promote the nucleic acid amplification reaction, particularly, PCR of the sample, through moving the sample supplied into the flow path 12A to the heating flow path 141 and to the cooling flow path 143 in the micro flow path 14 in an alternating manner back and forth a plurality of times and thereby forming a thermal cycle in the plate-shaped member 11A.

Second Embodiment

<Thermal Cycle Device>

A thermal cycle device including a flow path plate for thermal cycle according to a second embodiment will be described. The thermal cycle device according to the present embodiment includes two of the heating flow path 141 of the micro flow path 14A included in the flow path 12A of the flow path plate 10A for thermal cycle according to the first embodiment described above, with the second heating flow path situated at the succeeding stage of the cooling flow path 143. The thermal cycle device according to the present embodiment also includes a third temperature adjuster configured to adjust a sample to an intermediate temperature between the adjusting-target temperature of the first temperature adjuster 30 and the adjusting-target temperature of the second temperature adjuster 40 of the thermal cycle device 1A according to the first embodiment described above.

Figure 9:
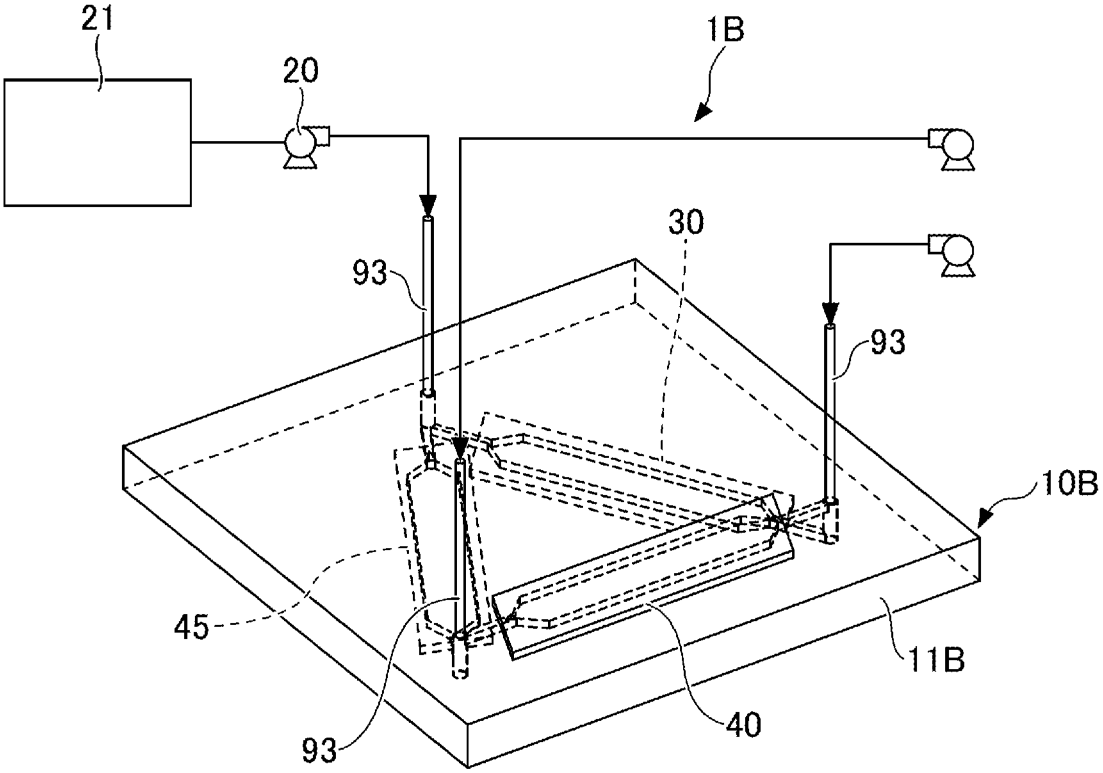
FIG. 9 is a view illustrating the configuration of a thermal cycle device including a flow path plate for thermal cycle according to a second embodiment.

FIG. 9 is a view illustrating the configuration of the thermal cycle device including the flow path plate for thermal cycle according to the second embodiment. As illustrated in FIG. 9, a thermal cycle device 1B according to the present embodiment includes a flow path plate 10B for thermal cycle, a conveying member 20, a first temperature adjuster 30, a second temperature adjuster 40, a third temperature adjuster 45, a light-emitting member 50, a light-receiving member 60, a control unit 70, and a display unit 80, and is configured to promote the nucleic acid amplification reaction of a nucleic acid contained in a nucleic acid-containing sample. In the present embodiment, the thermal cycle device 1B has the same configuration as that of the first embodiment, except the configuration of the flow path plate 10B for thermal cycle and the third temperature adjuster 45. Hence, the flow path plate 10B for thermal cycle and the third temperature adjuster 45 will only be described, and description of any other components will be omitted.

(Flow Path Plate for Thermal Cycle)

Figure 10:
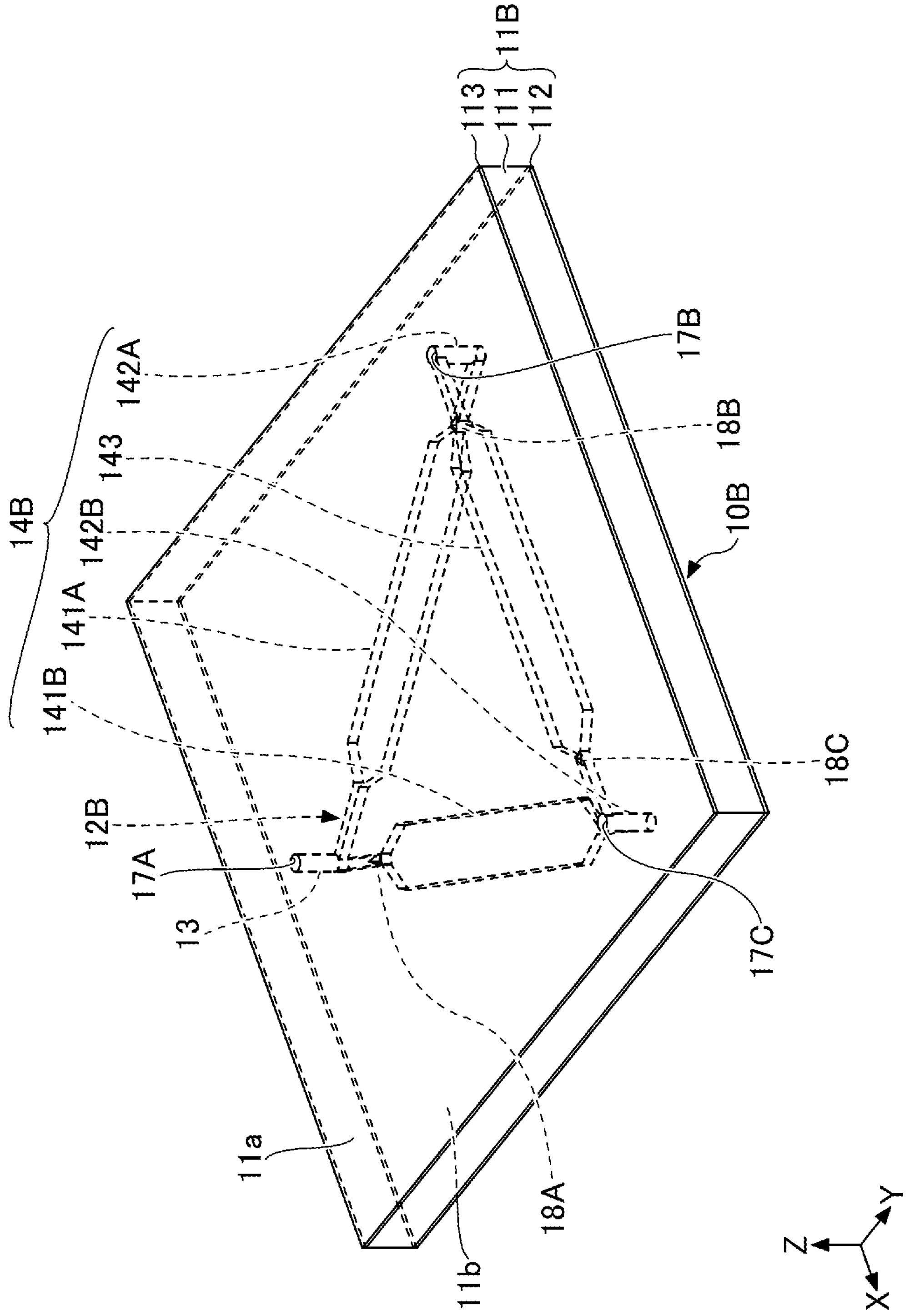
FIG. 10 is an oblique view of the flow path plate for thermal cycle according to the second embodiment.
Figure 11:
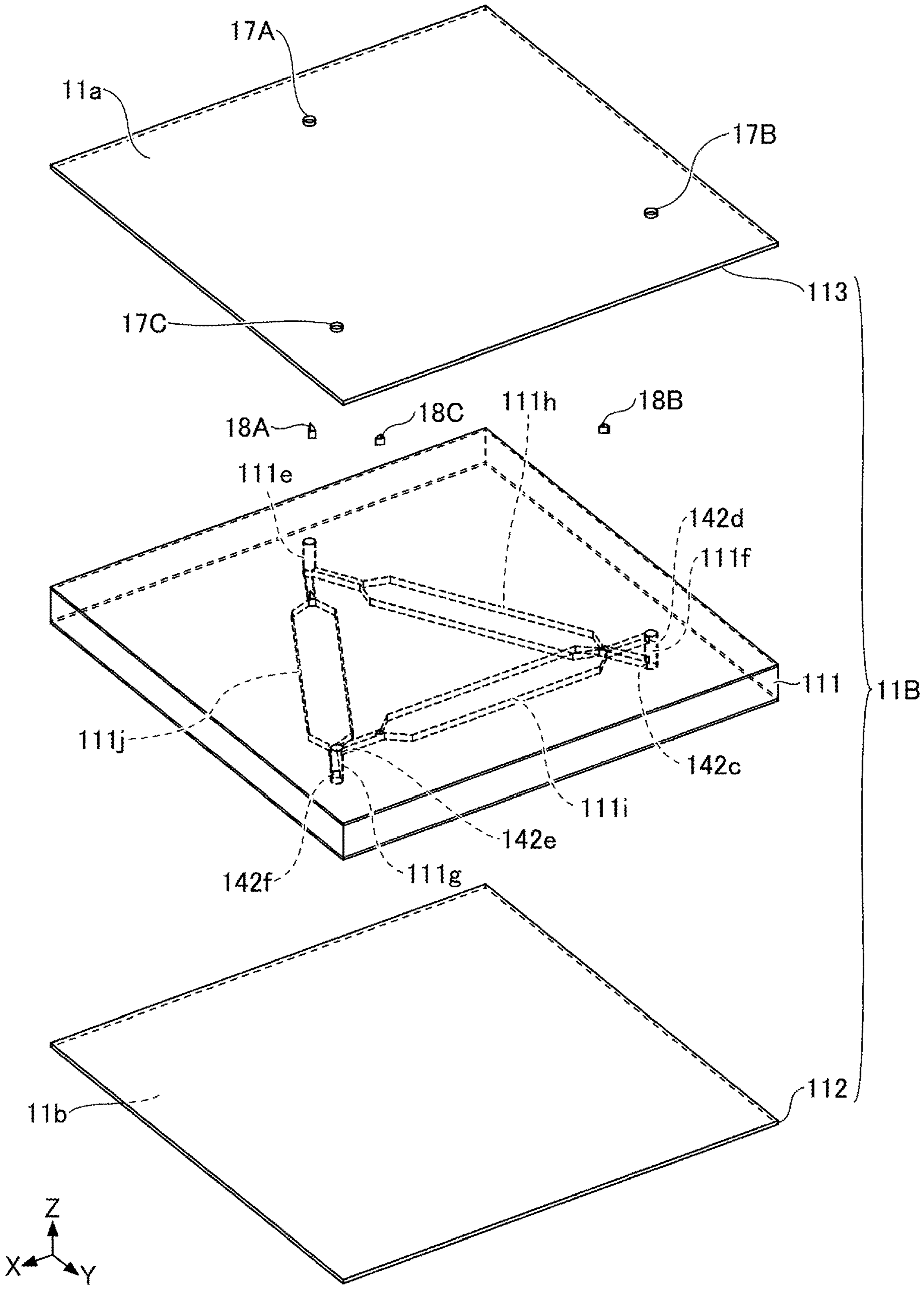
FIG. 11 is an exploded oblique view of a flow path plate for thermal cycle.
Figure 12:
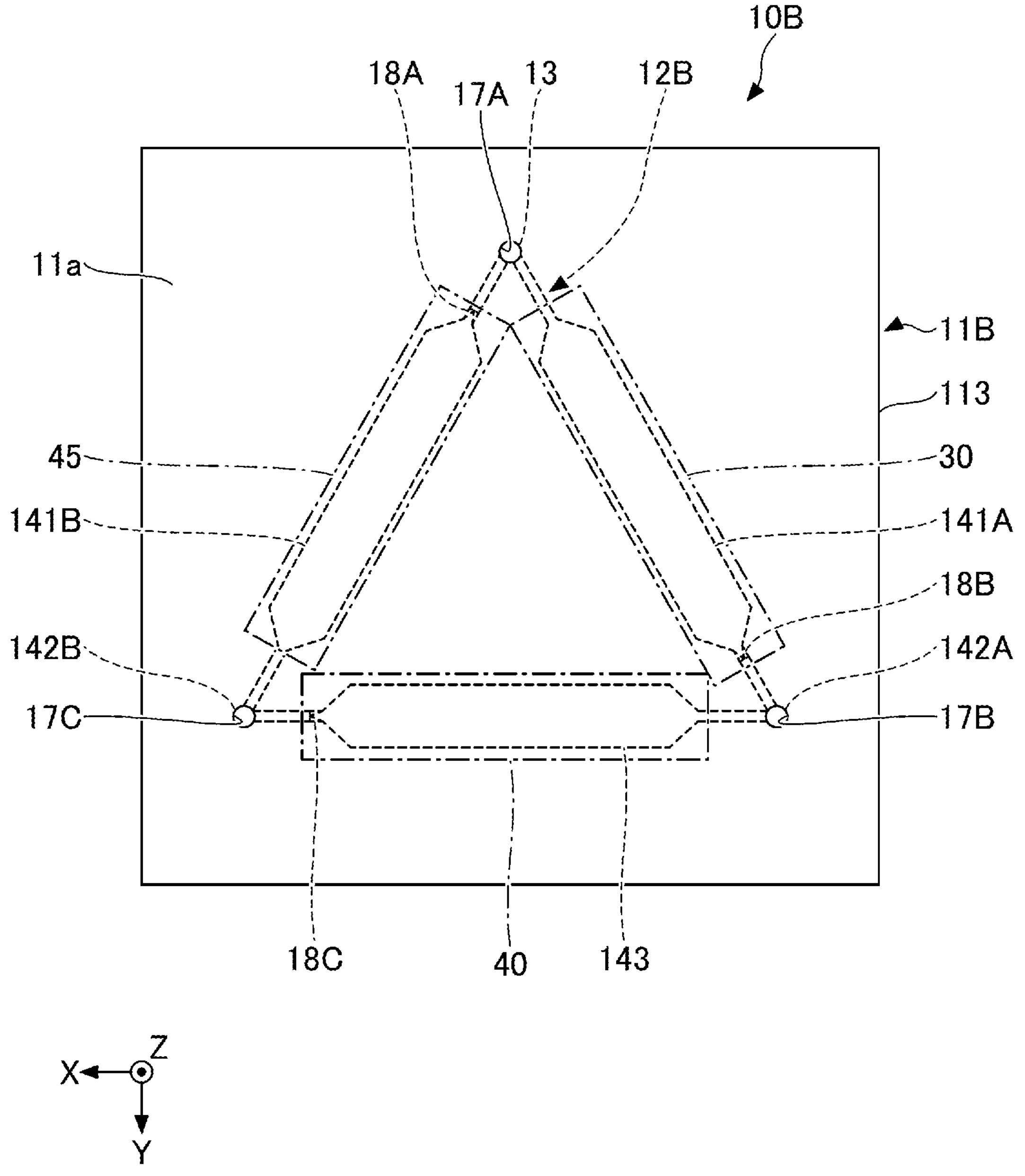
FIG. 12 is a plan view of a flow path plate for thermal cycle.

FIG. 10 is an oblique view of the flow path plate for thermal cycle according to the second embodiment. FIG. 11 is an exploded oblique view of the flow path plate for thermal cycle. FIG. 12 is a plan view of the flow path plate for thermal cycle. As illustrated in FIG. 10 and FIG. 11, the flow path plate 10B for thermal cycle includes a plate-shaped member 11B instead of the plate-shaped member 11A of the flow path plate 10A for thermal cycle according to the first embodiment described above. As illustrated in FIG. 12, the plate-shaped member 11B may be formed in an approximately square shape in a plan view of the plate-shaped member 11B.

As illustrated in FIG. 10, the plate-shaped member 11B internally includes a flow path 12B through which a sample passes. The present embodiment has the same configuration as that of the flow path plate 10A for thermal cycle according to the first embodiment described above except that the change in the configuration of the flow path 12B. Hence, the present embodiment will be described only in respect of the configuration of the flow path 12B.

The flow path 12B includes a guiding flow path 13 and a micro flow path 14B. The flow path 12B has openings 17A to 17C in the principal surface 11*a* of the plate-shaped member 11B in the +Z-axis direction, and includes membrane valves 18 in halfway portions of the micro flow path 14B.

As illustrated in FIG. 11, holes and grooves forming a shape conforming the flow path 12B are formed in the center base material 111.

Holes 111*e* to 111*g* in the center base material 111 are formed in an approximately circular shape when seen in a center line of the holes 111*e* to 111*g*. The guiding flow path 13 and parts of the micro flow path 14B (connecting flow paths 142A and 142B described below), which are illustrated in FIG. 10, are each formed in the holes 111*e* to 111*g* in the center base material 111 in an approximately circular shape.

Lower grooves 111*h* and 111*j* of the center base material 111 are formed in the lower surface of the center base material 111, and are formed in an approximately rectangular shape like the lower groove 111*c*. By the center base material 111 and the lower thin plate member 112 being pasted to each other, parts of the micro flow path 14B (heating flow paths 141A and 141B described below) illustrated in FIG. 10 are formed in the center base material 111. That is, parts of the micro flow path 14B (the heating flow paths 141A and 141B described below) illustrated in FIG. 10 are formed on the center base material 111 side of the junction surface between the center base material 111 and the lower thin plate member 112.

An upper groove 111*i* of the center base material 111 is formed in the upper surface of the center base material 111, and is formed in an approximately rectangular shape like the upper groove 111*d*. By the center base material 111 and the upper thin plate member 113 being pasted to each other, a part of the micro flow path 14B (the cooling flow path 143 escribed below) illustrated in FIG. 10 is formed in the center base material 111. That is, a part of the micro flow path 14B (the cooling flow path 143 described below) illustrated in FIG. 10 is formed on the center base material 111 side of the junction surface between the center base material 111 and the upper thin plate member 113.

Holes having a shape conforming to the openings 17A to 17C are formed in the upper thin plate member 113. The holes in the upper thin plate member 113 are formed in an approximately circular shape when seen in a center line of the holes. That is, the openings 17A to 17C are formed in the upper thin plate member 113, and are formed in an approximately circular shape in a plan view of the plate-shaped member 11B.

As illustrated in FIG. 12, the opening 17A is situated near the −Y-axis direction-side side of the principal surface 11*a* of the plate-shaped member 11B in a plan view of the plate-shaped member 11B. The opening 17B is situated near the −X-axis direction-side side and the +Y-axis direction-side side of the principal surface 11*a* of the plate-shaped member 11B in a plan view of the plate-shaped member 11B. The opening 17C is situated near +X-axis direction-side side and the +Y-direction-side side of the principal surface 11*a* of the plate-shaped member 11B in a plan view of the plate-shaped member 11B. The openings 17B and 17C are situated approximately symmetrically with respect to a center line passing approximately the centers of the X-axis direction sides of the plate-shaped member 11B and parallel with the Y-axis direction sides of the plate-shaped member 11B (the Y-axis direction sides being orthogonal to the X-axis direction sides).

By the center base material 111, the lower thin plate member 112, and the upper thin plate member 113 being joined with each other, the flow path 12B is formed. As illustrated in FIG. 10, the flow path 12B is situated inside the plate-shaped member 11B, and functions as a passage for a sample to pass through the plate-shaped member 11B.

As illustrated in FIG. 10, the guiding flow path 13 is formed in the center base material 111. The guiding flow path 13 is situated at a position corresponding to approximately the center of an X-axis direction side of the plate-shaped member 11B near the −Y-axis direction-side side of the plate-shaped member 11B. The guiding flow path 13 joins the opening 17A and the micro flow path 14B to each other. The guiding flow path 13 is formed in the thickness direction (−Z-axis direction) of the plate-shaped member 11B approximately perpendicularly to the opening 17A. The guiding flow path 13 extends from the opening 17A in the −Z-axis direction to the boundary between the center base material 111 and the lower thin plate member 112 and is joined to the micro flow path 14B.

As illustrated in FIG. 10 and FIG. 11, the micro flow path 14B is formed in the center base material 111, and is formed as a result of the center base material 111, the lower thin plate member 112, and the upper thin plate member 113 being pasted to each other.

As illustrated in FIG. 10, the micro flow path 14B is a flow path formed in a circulating manner with one end and the other end thereof joined to the guiding flow path 13, in order to heat and cool a sample flowing from the guiding flow path 13. The micro flow path 14B includes the heating flow path 141A, the connecting flow path 142A, the cooling flow path 143, the connecting flow path 142B, and the heating flow path 141B.

As illustrated in FIG. 10, the heating flow path 141A is joined to the side surface of the guiding flow path 13 and extends in a horizontal direction in the plate-shaped member 11B. The heating flow path 141A is constituted by a space enclosed by the lower groove 111*h* formed in the lower surface of the center base material 111 and by the lower thin plate member 112. The heating flow path 141A is formed to have a flow path of increased size at a location partway along the heating flow path 141A.

A cross-section of the heating flow path 141A has an approximately rectangular shape when seen in a direction orthogonal to the flow of a sample.

Figure 13:
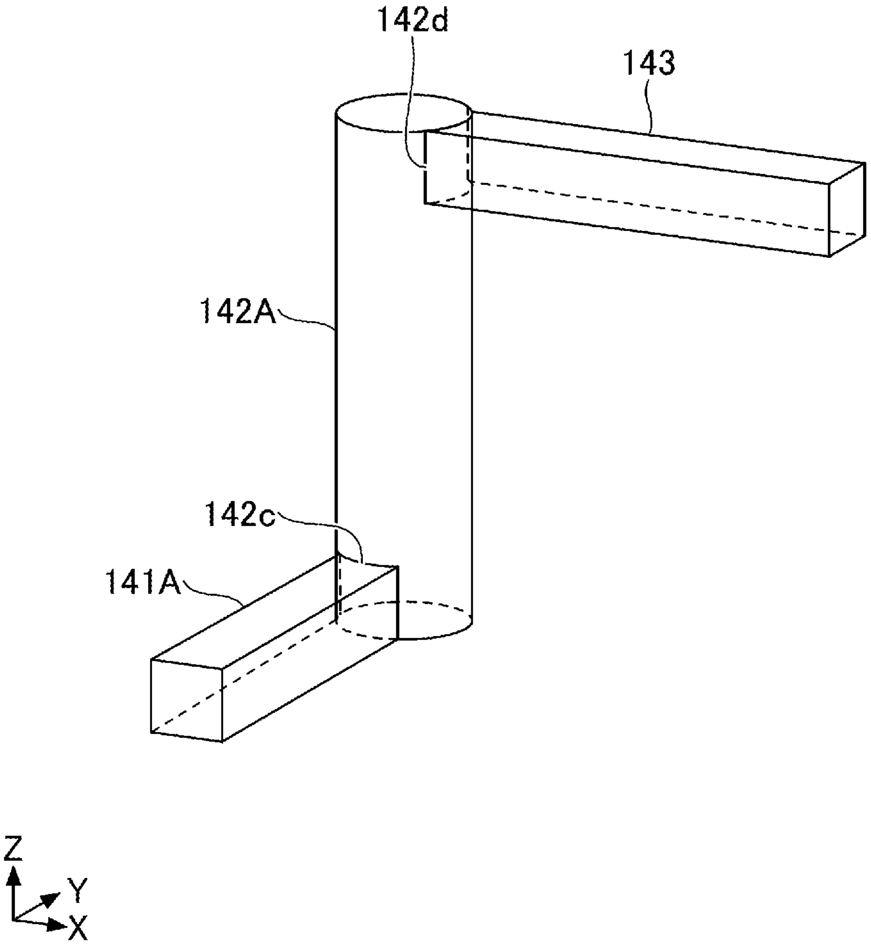
FIG. 13 is an oblique view illustrating only a part of a flow path in a plate-shaped member.

The connecting flow path 142A is formed to penetrate the center base material 111 such that light can be transmitted in the upper-lower direction of the plate-shaped member 11B, and connects the heating flow path 141A and the cooling flow path 143 to each other. The connecting flow path 142A is a space that is constituted by a hole 111*f* formed in the principal surfaces of the center base material 111, and through which the lower groove 111*h* and the upper groove 111*i* communicate with each other as illustrated in FIG. 13. The connecting flow path 142A has liquid circulation openings 142*c* and 142*d* in the internal surface. As illustrated in FIG. 11, in a plan view of the plate-shaped member 11B, the circulation opening 142*c* is formed on the −Y-axis direction side of the connecting flow path 142A, and the circulation opening 142*d* is formed on the +X-axis direction side of the connecting flow path 142A. As illustrated in FIG. 13, the connecting flow path 142A is joined to the heating flow path 141A via the internal surface of the connecting flow path 142A on the −Y-axis direction side, and is joined to the cooling flow path 143 via the internal surface of the connecting flow path 142A on the +X-axis direction side. The details of the connecting flow path 142A will be omitted, because the connecting flow path 142A is the same as the connecting flow path 142 of the flow path plate 10A for thermal cycle according to the first embodiment described above.

As illustrated in FIG. 10, the cooling flow path 143 extends in a horizontal direction in the plate-shaped member 11B by joining the connecting flow path 142A and the connecting flow path 142B to each other. As illustrated in FIG. 11, the cooling flow path 143 is constituted by a space enclosed by the upper groove 111*i* formed in the upper surface of the center base material 111 and by the upper thin plate member 113. The cooling flow path 143 is formed to have a flow path of increased size at a location partway along the cooling flow path 143, like the heating flow path 141A. A cross-section of the cooling flow path 143 may have an approximately rectangular shape when seen in a direction orthogonal to the flow of a sample, like the heating flow path 141A.

Figure 14:
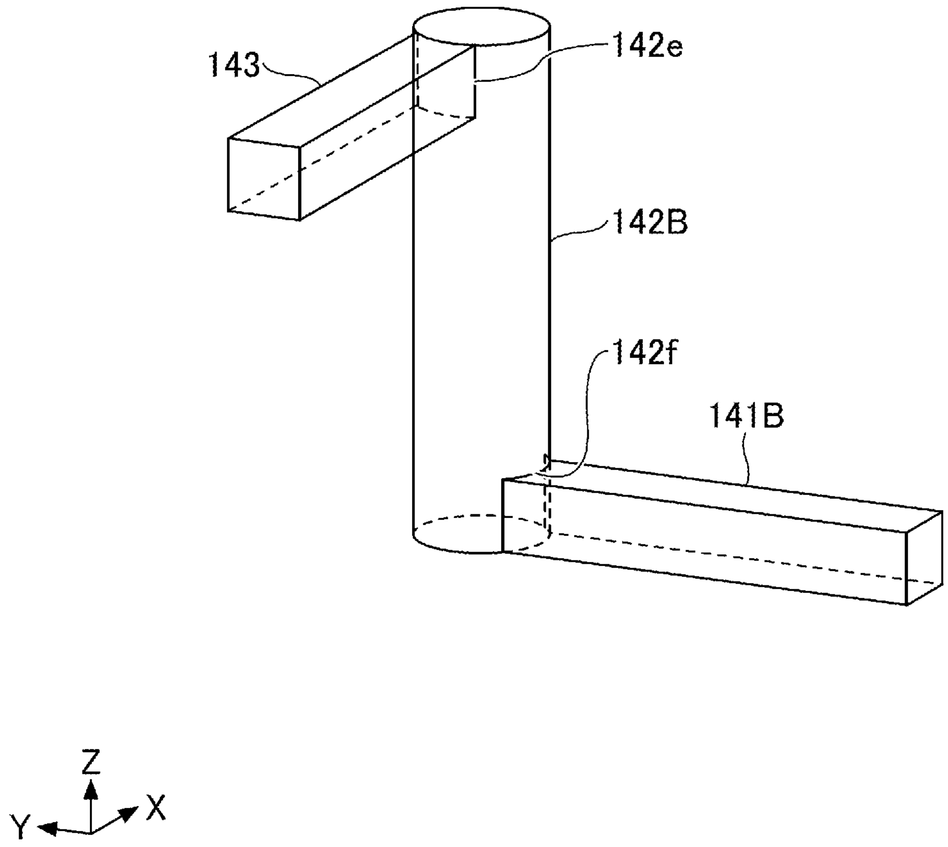
FIG. 14 is an oblique view illustrating only another part of a flow path in a plate-shaped member.

The connecting flow path 142B is formed to penetrate the center base material 111 such that light can be transmitted in the upper-lower direction of the plate-shaped member 11B like the connecting flow path 142A, and connects the cooling flow path 143 and the heating flow path 141B to each other. The connecting flow path 142B is a space that is constituted by a hole 111*g* formed in the principal surfaces of the center base material 111, and through which the upper groove 111*i* and the lower groove 111*j* communicate with each other as illustrated in FIG. 14. The connecting flow path 142B has liquid circulation openings 142*e* and 142*f* in the internal wall. As illustrated in FIG. 11, the circulation opening 142*e* is formed on the −X-axis direction side of the connecting flow path 142B, and the circulation opening 142*f* is formed on the −Y-axis direction side of the connecting flow path 142B. As illustrated in FIG. 14, the connecting flow path 142B is joined to the cooling flow path 143 via the internal surface of the connecting flow path 142B on the −X-axis direction side, and is joined to the heating flow path 141B via the internal surface of the connecting flow path 142B on the −Y-axis direction side. The details of the connecting flow path 142B will be omitted, because the connecting flow path 142B is the same as the connecting flow path 142A except that it is a flow path connecting the cooling flow path 143 and the heating flow path 141B to each other.

As illustrated in FIG. 10, the heating flow path 141B is joined to the side surface of the connecting flow path 142B and to the side surface of the guiding flow path 13, and extends in a horizontal direction in the plate-shaped member 11B. The heating flow path 141B is constituted by a space enclosed by the lower groove 111*j* formed in the lower surface of the center base material 111 and by the lower thin plate member 112. The details of the heating flow path 141B will be omitted, because the heating flow path 141B is the same as the heating flow path 141A except that it is a flow path connecting the connecting flow path 142B and the guiding flow path 13 to each other.

As illustrated in FIG. 10 and FIG. 12, the openings 17A to 17C are used as holes through which a sample is supplied or expelled, or as holes for controlling the pressure in the flow path 12B. Syringes 93 (see FIG. 9) of syringe pumps are inserted into the openings 17A to 17C. In the present embodiment, the syringe 93 (see FIG. 9) inserted into the opening 17A functions as the supply tube 91 (see FIG. 1 and FIG. 2) and the expelling tube 92 (see FIG. 1 and FIG. 2) for supplying and expelling a sample, and the syringes 93 (see FIG. 9) inserted into the openings 17B and 17C function as tubes for supplying air into and suctioning air from the flow path 12B.

As illustrated in FIG. 10 and FIG. 12, the membrane valves 18 are situated on some parts of the micro flow path 14B. The membrane valves 18 may be attached fixed to the micro flow path 14B in a detachably attachable manner. The membrane valves 18 include three membrane valves 18A to 18C.

Figure 15:
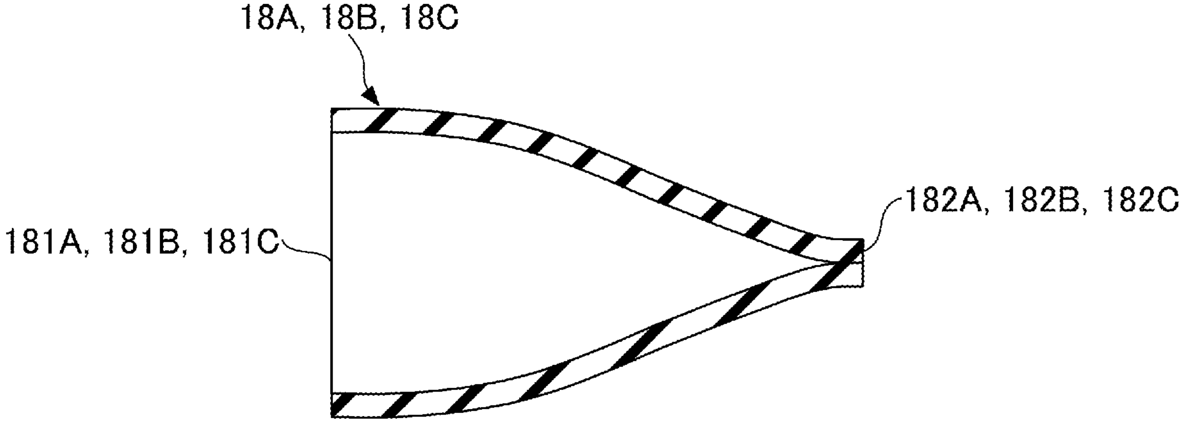
FIG. 15 is a cross-sectional view illustrating an example of a state in which a membrane valve is closed.

The membrane valve 18A is attached in a horizontal direction to the internal wall of a joining portion of the heating flow path 141A joining a larger cross-sectional area region of the heating flow path 141A to a smaller cross-sectional area region thereof. As illustrated in FIG. 15, an upstream end 181A of the membrane valve 18A is positioned on the guiding flow path 13 side, and a downstream end 182A thereof is positioned on the connecting flow path 142A side.

The membrane valve 18B is attached in a horizontal direction to the internal wall of a joining portion of the cooling flow path 143 joining a larger cross-sectional area region of the cooling flow path 143 to a smaller cross-sectional area region thereof. As illustrated in FIG. 15, an upstream end 181B of the membrane valve 18B is positioned on the connecting flow path 142A side, and a downstream end 182A thereof is positioned on the connecting flow path 142B side.

The membrane valve 18C is attached in a horizontal direction to the internal wall of a joining portion of the heating flow path 141B joining a larger cross-sectional area region of the heating flow path 141B to a smaller cross-sectional area region thereof. As illustrated in FIG. 15, an upstream end 181C of the membrane valve 18C is positioned on the connecting flow path 142B side, and a downstream end 182C thereof is positioned on the guiding flow path 13 side.

The membrane valves 18A to 18C are tubular moldings made of an elastic material such as rubber, and, in a free state, have an opening shape gradually narrowing from the upstream ends 181A to 181C to the downstream ends 182A to 182C as illustrated in FIG. 15. The upstream ends 181A to 181C are opened in a rectangular shape as illustrated in FIG. 16, the middle portions of the membrane valves 18A to 18C have an elliptical cross-sectional shape, and the downstream ends 182A to 182C are in a state of the opening being closed, being in a straight line shape as illustrated in FIG. 17 when seen in the axial direction, to bring mutually facing internal circumferential surfaces into contact with each other.

At the downstream ends 182A to 182C, the opening is closed in an openable/closable manner, such that the opening is maintained in the closed state while no sample is coming flowing into the membrane valves 18A to 18C, and becomes opened due to a supplying pressure (positive pressure) of a sample when the sample comes flowing into the membrane valves 18A to 18C, or due to a negative pressure.

Figure 18:
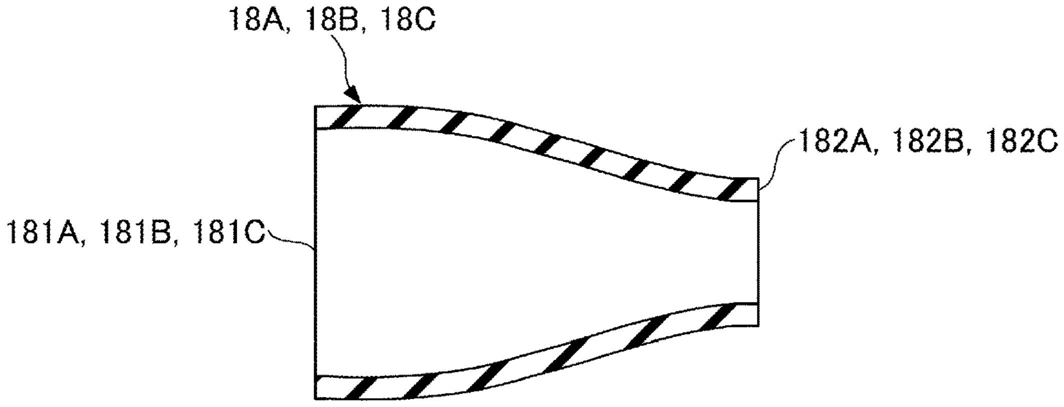
FIG. 18 is a cross-sectional view illustrating an example of a state in which a membrane valve is opened.

When the flow path 12B is at a negative pressure, a pulling force acts on the membrane valves 18A to 18C, and the closed downstream ends 182A to 182C become open as illustrated in FIG. 18. When the downstream ends 182A to 182C of the membrane valves 18A to 18C become open, a sample flowing into the membrane valves 18A to 18C from the heating flow paths 141A and 141B or from the cooling flow path 143 through the constantly opened upstream ends 181A to 181C flows out through the opened downstream ends 182A to 182C.

Figure 16:
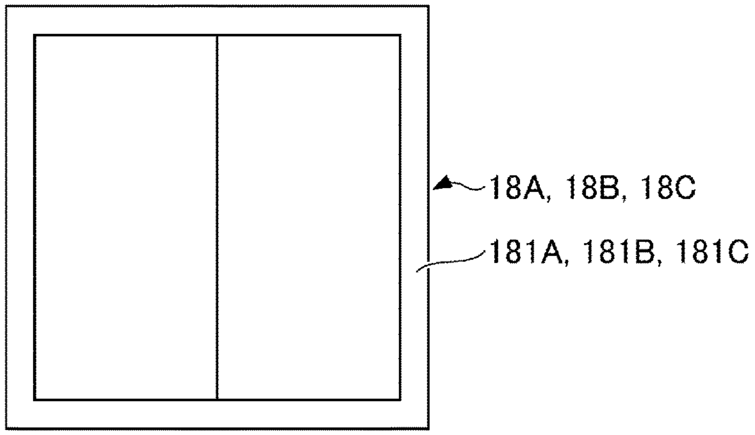
FIG. 16 is a view of a membrane valve seen from an upstream side.
Figure 17:
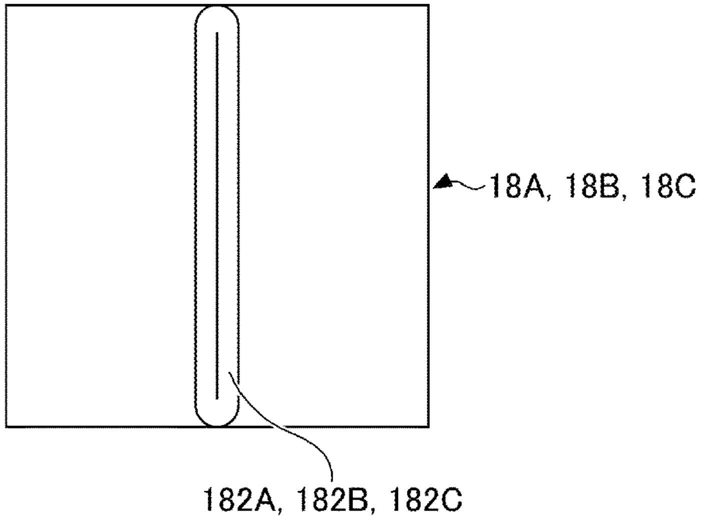
FIG. 17 is a view of a membrane valve seen from a downstream side.

The membrane valves 18A to 18C are not particularly limited to the membrane valve having the configuration illustrated in FIG. 15 to FIG. 17, and may be a valve that can adjust the opening in accordance with the pressure applied to the membrane valves 18A to 18C.

Like the plate-shaped member 11A, the plate-shaped member 11B includes a heating-target surface contacted by first temperature adjusters 30 and 45 configured to heat the heating flow paths 141A and 141B, and a cooling-target surface contacted by the second temperature adjuster 40 configured to cool the cooling flow path 143 at a temperature lower than that by the first temperature adjuster 30.

The heating-target surface is the principal surface (lower surface) 11*b* of the plate-shaped member 11B, and is positioned under the heating flow paths 141A and 141B. The cooling-target surface is a principal surface (upper surface) 11*a* of the plate-shaped member 11B, and is positioned above the cooling flow path 143.

(Third Temperature Adjuster)

As illustrated in FIG. 9, the third temperature adjuster 45 is situated to contact the heating-target surface (principal surface 11*b*) of the plate-shaped member 11B. As illustrated in FIG. 10, the third temperature adjuster 45 is situated in a region in which the heating flow path 141B is positioned in the heating-target surface of the plate-shaped member 11B in a plan view. The third temperature adjuster 45 functions as a heating element configured to heat the heating flow path 141B via the heating-target surface.

The third temperature adjuster 45 needs only to be able to heat a sample in the heating flow path 141B via the plate-shaped member 11B by adjusting the temperature of the sample to an intermediate temperature between the adjusting-target temperatures of the first temperature adjuster 30 and the second temperature adjuster 40. As the third temperature adjuster 45, the same heating device as the first temperature adjuster 30 may be used.

The third temperature adjuster 45 can appropriately heat the heating flow path 141B to a desirably selected temperature in accordance with the type of the sample, and the temperature is preferably, for example, from 60° C. through 72° C., and particularly preferably around 70° C. In a case where a sample is an analyte obtained by mixing a DNA and a PCR reagent, the temperature of the sample can be maintained at an optimal temperature for the activity of a DNA polymerase without separation of a primer contained in the sample in the specified temperature range.

There is a case where the third temperature adjuster 45 cannot conduct heat sufficiently to a sample when heating the sample in the heating flow path 141B. Hence, the setting temperature of the third temperature adjuster 45 may be set to be higher by some degrees Celsius (e.g., by from 2° C. through 3° C.) in accordance with the temperature of the sample.

The installation area of the third temperature adjuster 45 needs only to be in a range in which the heating flow path 141B is included in a plan view of the plate-shaped member 11B.

The thermal cycle device 1B may include a non-illustrated temperature sensor or the like on the heating-target surface (principal surface 11*b*) of the plate-shaped member 11B, and may control the temperature of the heating flow path 141B.

An example of how to use the thermal cycle device 1B according to the present embodiment will be described.

After the flow path plate 10B for thermal cycle is inserted into the device main body of the non-illustrated thermal cycle device and positionally fixed in the device main body, the syringes 93 are automatically inserted into the openings 17A to 17C as illustrated in FIG. 10. Subsequently, air in the flow path 12B is suctioned through the syringes provided into the openings 17B and 17C, to thereby close the membrane valve 18A and open the membrane valves 18B and 18C. In response to a sample being supplied into the opening 17A through the syringe 93 inserted into the opening 17A, the sample supplied into the opening 17A flows in the thickness direction (−Z-axis direction) of the flow path plate 10B for thermal cycle through the guiding flow path 13 from the opening 17A, and then flows through the heating flow path 141A formed in the lower surface of the center base material 111 from the guiding flow path 13.

The sample flowing through the heating flow path 141A is heated to a high temperature (e.g., 94° C.) by the first temperature adjuster 30 while passing through the heating flow path 141A (thermal denaturation). By the sample in the heating flow path 141A being heated, double-stranded DNA contained in the sample is separated into single-stranded DNA.

Here, because the sample that flows through the heating flow path 141A is heated from under, a convection flow of the sample flowing through the heating flow path 141A is easily induced as described above. Hence, the sample flowing through the heating flow path 141A can be easily heated to a high temperature owing to the convection flow thereof.

The sample may be retained in the heating flow path 141A until it is heated to a high temperature (e.g., 94° C.), by supplying of the sample from the opening 17A being stopped and by the membrane valves 18A to 18C being controlled to be opened or closed by stopping suctioning of air in the flow path 12B through the syringes provided into the openings 17B and 17C.

The sample that has passed the heating flow path 141A then passes the membrane valve 18B, and then flows in the thickness direction (+Z-axis direction) of the flow path plate 10B for thermal cycle by passing through the connecting flow path 142A.

Before the sample comes flowing through the connecting flow path 142A or in a state in which the sample is flowing through the connecting flow path 142A, the measurement light may be emitted from the light-emitting member 50 (see FIG. 1) into the connecting flow path 142A such that the measurement light passes through the connecting flow path 142A. In this case, the light emitted from the light-emitting member 50 (see FIG. 1) passes through the connecting flow path 142A, and is then received and detected by the light-receiving member 60 (see FIG. 1). The detection result detected by the light-receiving member 60 (see FIG. 1) is sent to the control unit 70 (see FIG. 1) through the wiring 61 (see FIG. 1), and the control unit 70 (see FIG. 1) analyzes each component in the sample that has passed through the connecting flow path 142A. By the control unit 70 (see FIG. 1) sending the analysis result to the display unit 80 (see FIG. 1), and the analysis result being displayed on the display unit 80 (see FIG. 1), it is possible to confirm that the sample coming from the heating flow path 141A has passed through the connecting flow path 142A.

Next, by suctioning of air in the flow path 12B through the syringe 93 inserted into the opening 17B being stopped, the sample goes flowing from the connecting flow path 142A through the cooling flow path 143 formed in the upper surface of the center base material 111.

The sample flowing through the cooling flow path 143 is cooled to a low temperature (e.g., 60° C.) by the second temperature adjuster 40 (annealing and elongation). By the sample in the cooling flow path 143 being cooled, the amplification reaction of the DNA contained in the sample is promoted through annealing of single-stranded DNA and the primer contained in the sample and elongation of the DNA.

Here, because the sample flowing through the cooling flow path 143 is cooled from above, a convection flow of the sample flowing through the cooling flow path 143 is easily induced as described above. Hence, the sample flowing through the cooling flow path 143 can be easily cooled to a low temperature owing to the convection flow thereof.

The sample may be retained in the cooling flow path 143 until it is cooled to a low temperature (e.g., 60° C.), by supplying of the sample from the opening 17A being stopped and by the membrane valves 18A to 18C being controlled to be opened or closed by stopping supplying of air in the flow path 12B through the syringes provided into the openings 17B and 17C.

The sample that has passed the cooling flow path 143 then passes the membrane valve 18C, and then flows in the thickness direction (−Z-axis direction) of the flow path plate 10B for thermal cycle by passing through the connecting flow path 142B.

Before the sample comes flowing through the connecting flow path 142B or in a state in which the sample is flowing through the connecting flow path 142B, the measurement light may be emitted from the light-emitting member 50 (see FIG. 1) into the connecting flow path 142B such that the measurement light passes through the connecting flow path 142B, in order for each component in the sample that has passed the connecting flow path 142B to be analyzed.

Next, supplying of the sample through the syringe 93 provided into the opening 17A is stopped to stop air from being pressure-fed into the flow path 12B, and air is supplied into the flow path 12B through the syringe provided into the opening 17C to close the membrane valve 18C. This causes the sample from the connecting flow path 142B to flow through the heating flow path 141B formed in the lower surface of the center base material 111.

The sample flowing through the heating flow path 141B is heated to an intermediate temperature (e.g., from 60° C. through 72° C.) by the third temperature adjuster 45 while passing through the heating flow path 141B. By the sample in the heating flow path 141B being heated to an intermediate temperature, the temperature of the sample can be maintained at an optimal temperature for the activity of a DNA polymerase without separation of a primer contained in the sample.

Here, because the sample that flow through the heating flow path 141B is heated from under, a convection flow of the sample flowing through the heating flow path 141B is easily induced as described above. Hence, the sample flowing through the heating flow path 141B can be easily cooled to an intermediate temperature owing to the convection flow thereof.

The sample may be retained in the heating flow path 141B until it is heated to an intermediate temperature (e.g., from 60° C. through 72° C.), by supplying of the sample from the opening 17A being stopped and by the membrane valves 18A to 18C being controlled to be opened or closed by stopping supplying of air in the flow path 12B through the syringes 93 provided into the openings 17B and 17C.

Figure 19:
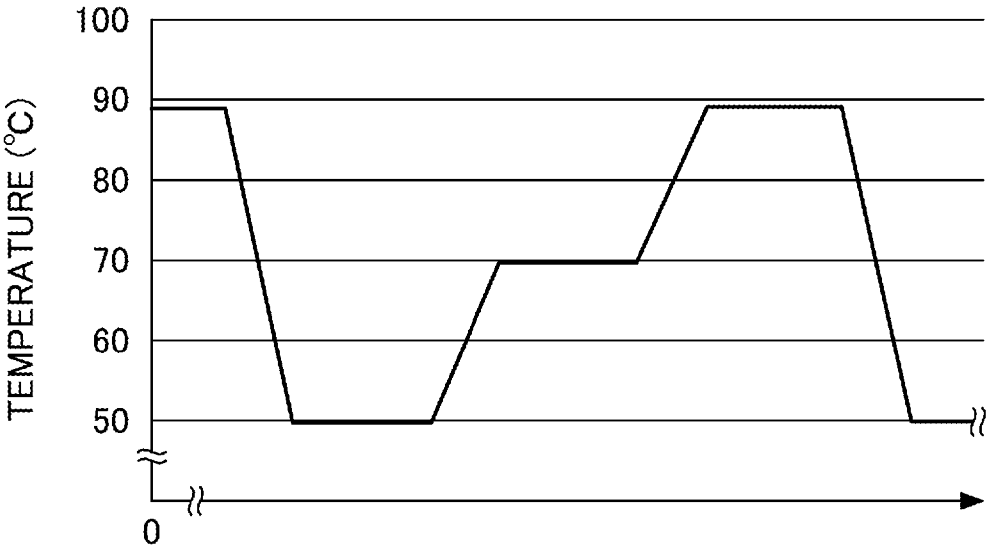
FIG. 19 is a graph indicating an example of a temperature change of a sample.

The sample that has passed the heating flow path 141B then passes the membrane valve 18A, and then flows into the guiding flow path 13. The process from the sample being supplied into the heating flow path 141A until the sample being expelled from the heating flow path 141B is defined as one cycle. The sample that has passed the heating flow path 141B, then passes the membrane valve 18A, and then passes through the guiding flow path 13, to be flowed again into the heating flow path 141A and circulated by one cycle or more in the same manner as described above. This causes the sample temperature to repeat reaching 90° C., 50° C., and 70° C. as illustrated in FIG. 19, making it possible to reliably promote the nucleic acid amplification reaction, particularly, PCR of the sample.

After circulating through the flow path 12B by one cycle or more, the sample is expelled through the guiding flow path 13 into the syringe 93 from the opening 17A. The sample expelled into the syringe 93 (see FIG. 9) from the opening 17A may be analyzed (observed) via the control unit 70 (see FIG. 1).

Hence, the flow path plate 10B for thermal cycle according to the present embodiment includes the two heating flow paths 141A and 141B, with the heating flow path 141B situated at the succeeding stage of the cooling flow path 143. The heating-target surface is situated under the heating flow paths 141A and 141B, and the cooling-target surface is situated above the cooling flow path 143. The flow path plate 10B for thermal cycle can induce a convection flow of a reagent in any of the heating flow paths 141A and 141B and the cooling flow path 143, not only when heating the sample in the heating flow path 141A or cooling the sample in the cooling flow path 143, but also when heating the sample in the heating flow path 141B by the third temperature adjuster 45. Hence, the flow path plate 10B for thermal cycle can easily make the reagent temperature uniform in any of these flow paths. Hence, the flow path plate 10B for thermal cycle, which can shorten the time taken until the temperature distribution in the heating flow paths 141A and 141B and the cooling flow path 143 becomes uniform, can shorten the sample processing time in the heating flow paths 141A and 141B and the cooling flow path 143.

The thermal cycle device 1B according to the present embodiment includes the flow path plate 10B for thermal cycle, the conveying member 20, the micro flow path 14B, the first temperature adjuster 30, the second temperature adjuster 40, and the third temperature adjuster 45. The micro flow path 14B includes the heating flow paths 141A and 141B, the connecting flow paths 142A and 142B, and the cooling flow path 143, with the first temperature adjuster 30 situated under the heating flow path 141A, the second temperature adjuster 40 situated above the cooling flow path 143, and the third temperature adjuster 45 situated under the heating flow path 141B. The thermal cycle device 1B can induce convection flows of a sample in the flow path 12B by heating or cooling, when heating the sample in the heating flow path 141A by the first temperature adjuster 30, cooling the sample in the cooling flow path 143 by the second temperature adjuster 40, and heating the sample in the heating flow path 141B by the third temperature adjuster 45. Hence, the thermal cycle device 1B, which can shorten the time taken until the temperature distribution in the flow path 12B becomes uniform, can shorten the sample processing time in the flow path 12B, like the thermal cycle device 1A.

EXAMPLES

The embodiments will be described more specifically below by way of Examples and Comparative Examples. The embodiments should not be construed as being limited to these Examples and Comparative Examples.

Example 1

[Production of Flow Path Plate for Thermal Cycle]

Three plate-shaped plates molded into a plate shape were prepared using a cycloolefin polymer (COP). Among them, one plate-shaped plate was prepared to have a thickness of 4 mm, and the remaining two plate-shaped plates were prepared to have a thickness of 0.188 mm. A lower groove was formed in the lower surface of the one plate-shaped plate, to produce a center base material. The lower groove was formed to have a depth of 1 mm, but to have a depth smaller than 1 mm at both ends of the groove and in the surrounding portions of the ends. The remaining two plate-shaped plates were used as a lower thin plate member and an upper thin plate member, respectively. Subsequently, an adhesive was applied to the junction surfaces between the center base material and each of the lower thin plate member and the upper thin plate member, and then thermocompression bonding was performed with the center base material sandwiched between the lower thin plate member and the upper thin plate member, to join the center base material and the lower thin plate member with each other, and join the center base material and the upper thin plate member with each other. In this way, a flow path plate for thermal cycle including: a flow path having a height of 1 mm in the lower surface of the center base material; and an inlet opening and an outlet opening on both ends of the flow path was produced. The flow path was formed to have a chamber shape in a cross-section taken in its longer axis direction.

[Heating]

Figure 20:
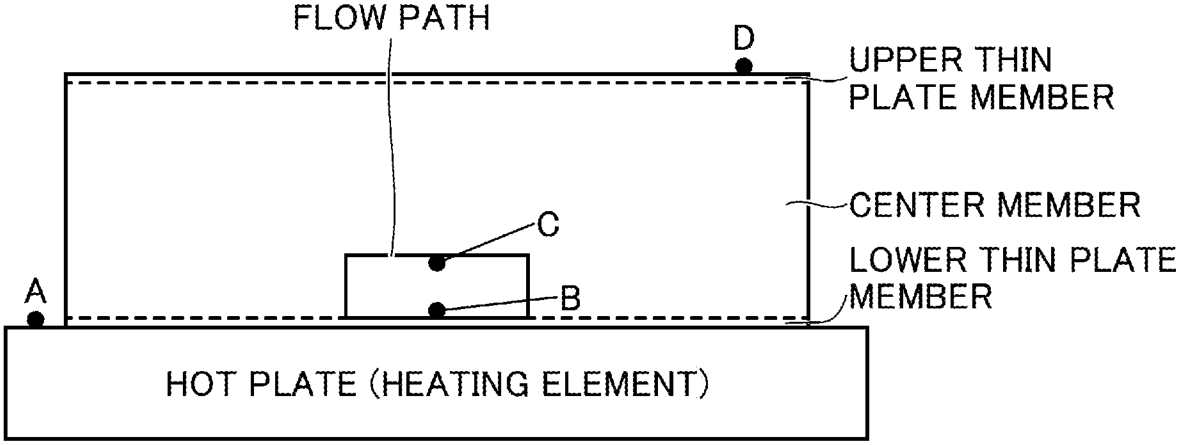
FIG. 20 is a view illustrating temperature measurement positions in Example 1.
Figure 21:
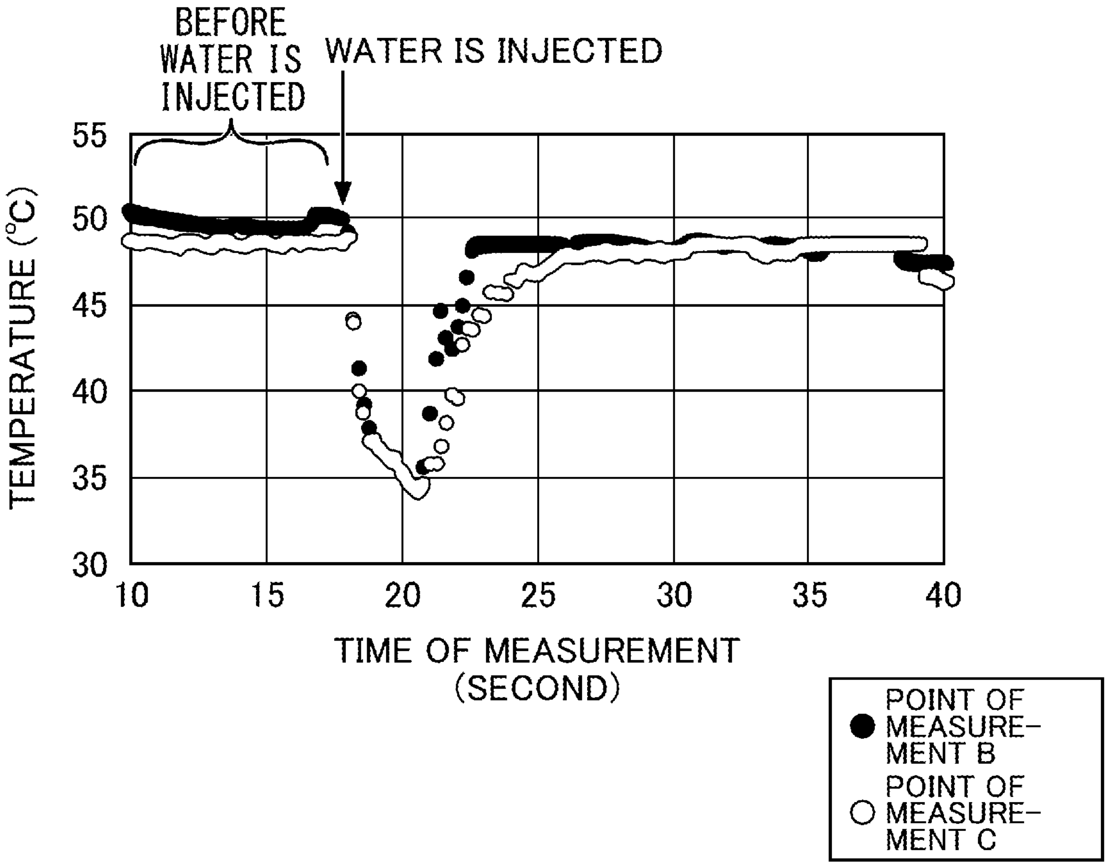
FIG. 21 is a graph indicating the temperature measurements at an upper surface and a lower surface of a flow path in a flow path plate for thermal cycle of Example 1.

The flow path plate for thermal cycle was placed on a hot plate to make the lower surface of the flow path plate for thermal cycle contact the hot plate, and, as illustrated in FIG. 20, thermocouples (GRAFTEC LOGGER GL240) were set on the surface of the hot plate (the point A in FIG. 20), on the lower surface (an internal surface of the flow path on the hot plate side) (the point B in FIG. 20) and the upper surface of the flow path (on an internal surface of the flow path in the center base material) (the point C in FIG. 20), and on the upper surface of the flow path plate for thermal cycle (the point D in FIG. 20). The hot plate was heated to 50° C. to heat the lower surface of the flow path plate for thermal cycle to 50° C., and pure water (20° C.) was supplied into the flow path. The temperature measurements from the lower surface (the internal surface of the flow path on the hot plate side) (the point B in FIG. 20) and the upper surface (the internal surface of the flow path in the center base material) (the point C in FIG. 20) of the flow path are indicated in FIG. 21.

Comparative Example 1

[Production of Flow Path Plate for Thermal Cycle]

A flow path plate for thermal cycle was produced in the same manner as in Example 1 except that a center base material was produced by forming the lower groove formed in the lower surface of the one plate-shaped plate in Example 1 in the upper surface of a plate-shaped plate as an upper groove.

[Heating]

Figure 22:
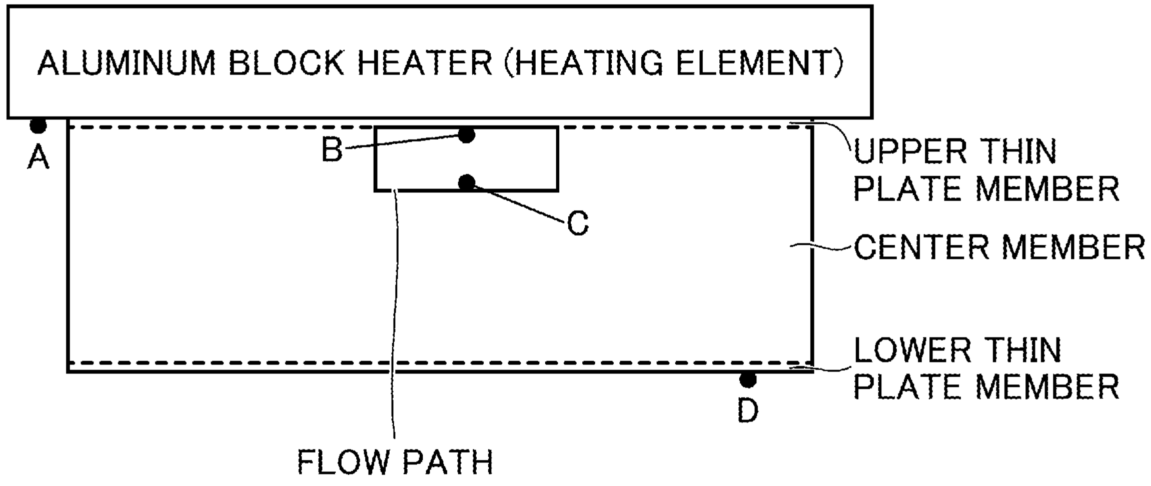
FIG. 22 is a view illustrating temperature measurement positions in Comparative Example 1.
Figure 23:
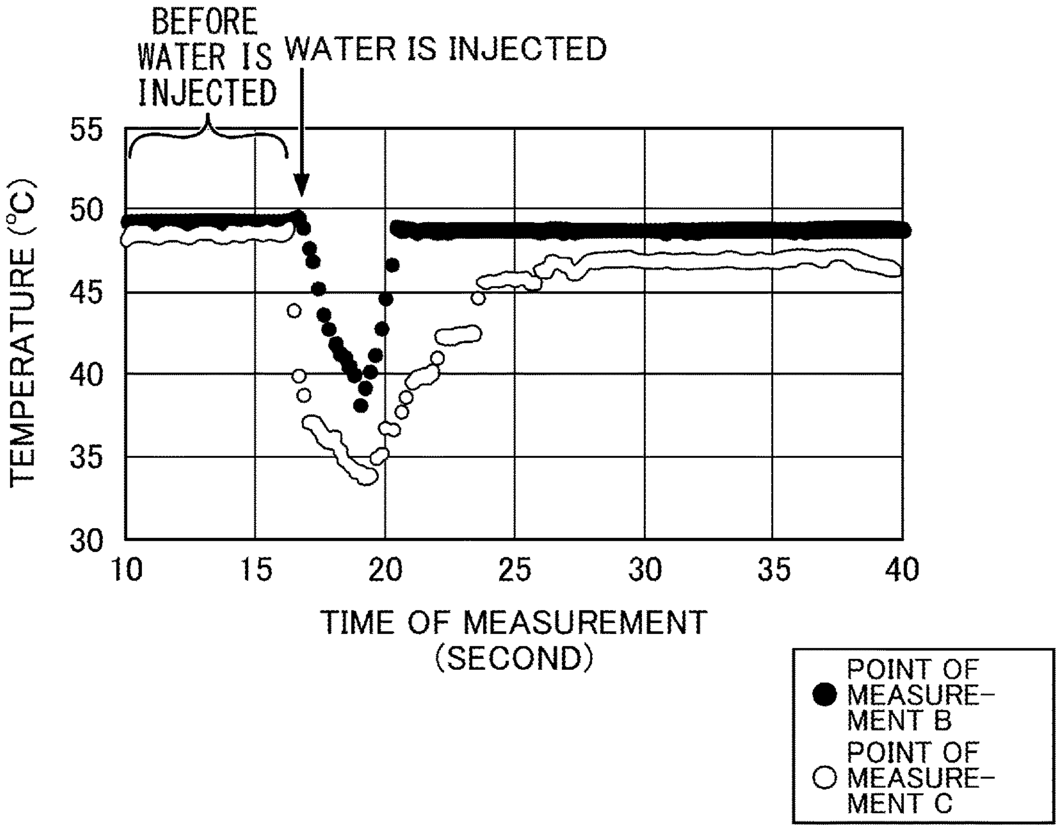
FIG. 23 is a graph indicating the temperature measurements at an upper surface and a lower surface of a flow path in a flow path plate for thermal cycle of Comparative Example 1.

The same as in Example 1 was performed except that unlike in Example 1, an aluminum block heater was placed on the upper surface of the flow path plate for thermal cycle to make the aluminum block heater contact the upper surface of the flow path plate for thermal cycle, and, as illustrated in FIG. 22, thermocouples (GRAFTEC LOGGER GL240) were set on the surface of the aluminum block heater (the point A in FIG. 22), on the upper surface (an internal surface of the flow path on the aluminum block heater side) (the point B in FIG. 22) and the lower surface (an internal surface of the flow path in the center base material) (the point C in FIG. 22) of the flow path, and on the lower surface of the flow path plate for thermal cycle (the point D in FIG. 22). The temperature measurements from the upper surface (the internal surface of the flow path on the aluminum block heater side) (the point B in FIG. 22) and the lower surface (the internal surface of the flow path in the center base material) (the point C in FIG. 22) of the flow path are indicated in FIG. 23.

Example 2

[Production of Flow Path Plate for Thermal Cycle]

A flow path plate for thermal cycle was produced in the same manner as in Comparative Example 1.

[Cooling]

Figure 24:
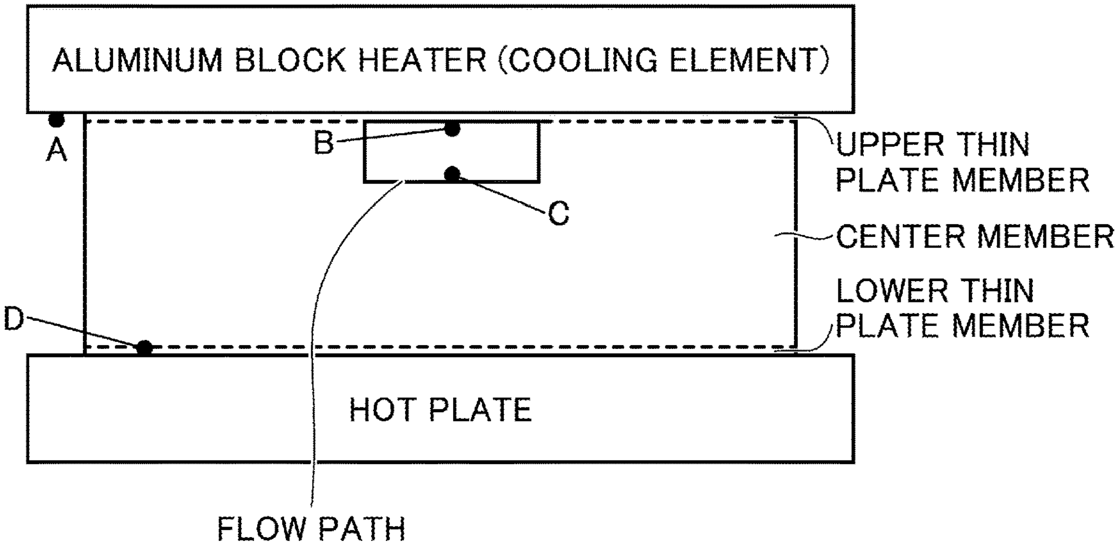
FIG. 24 is a view illustrating temperature measurement positions in Example 2.

In the same manner as in Comparative Example 1, an aluminum block heater to be used as the second temperature adjuster was placed on the upper surface of the flow path plate for thermal cycle to make the aluminum block heater contact the upper surface of the flow path plate for thermal cycle. The flow path plate for thermal cycle was placed on a hot plate. Then, as illustrated in FIG. 24, thermocouples (GRAFTEC LOGGER GL240) were set on the surface of the aluminum block heater (the point A in FIG. 24), on the upper surface (an internal surface of the flow path on the aluminum block heater side) (the point B in FIG. 24) and the lower surface (an internal surface of the flow path in the center base material) (the point C in FIG. 24) of the flow path, and on the lower surface of the flow path plate for thermal cycle (the point D in FIG. 24).

Figure 25:
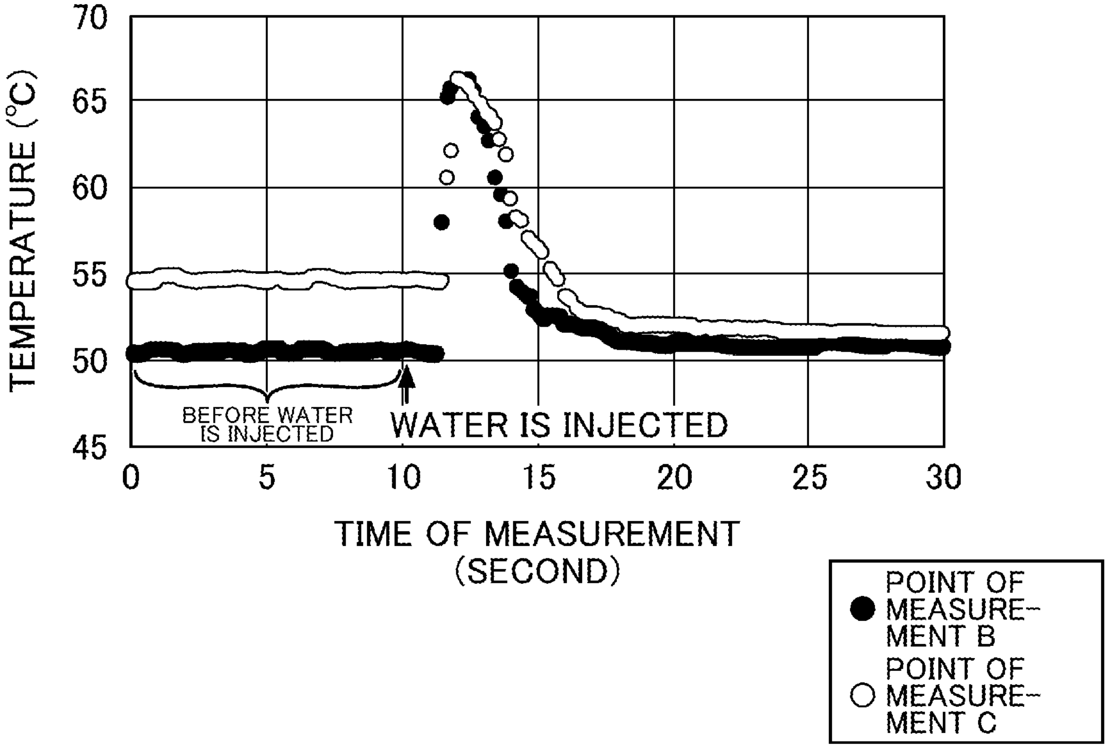
FIG. 25 is a graph indicating the temperature measurements at an upper surface and a lower surface of a flow path in a flow path plate for thermal cycle of Example 2.

The aluminum block heater was heated to 50° C. to heat the upper surface of the flow path plate for thermal cycle to 50° C., and pure water (70° C.) was supplied into the flow path, to cool the pure water in the flow path. In order that the flow path plate for thermal cycle would not be cooled at anywhere other than the upper surface, the hot plate was heated to 70° C., to heat the lower surface of the flow path plate for thermal cycle to 70° C. The temperature measurements from the upper surface (the internal surface of the flow path on the aluminum block heater side) (the point B in FIG. 24) and the lower surface (the internal surface of the flow path in the center base material) (the point C in FIG. 24) of the flow path are indicated in FIG. 25.

Comparative Example 2

[Production of Flow Path Plate for Thermal Cycle]

A flow path plate for thermal cycle was produced in the same manner as in Example 1.

[Cooling]

Figure 26:
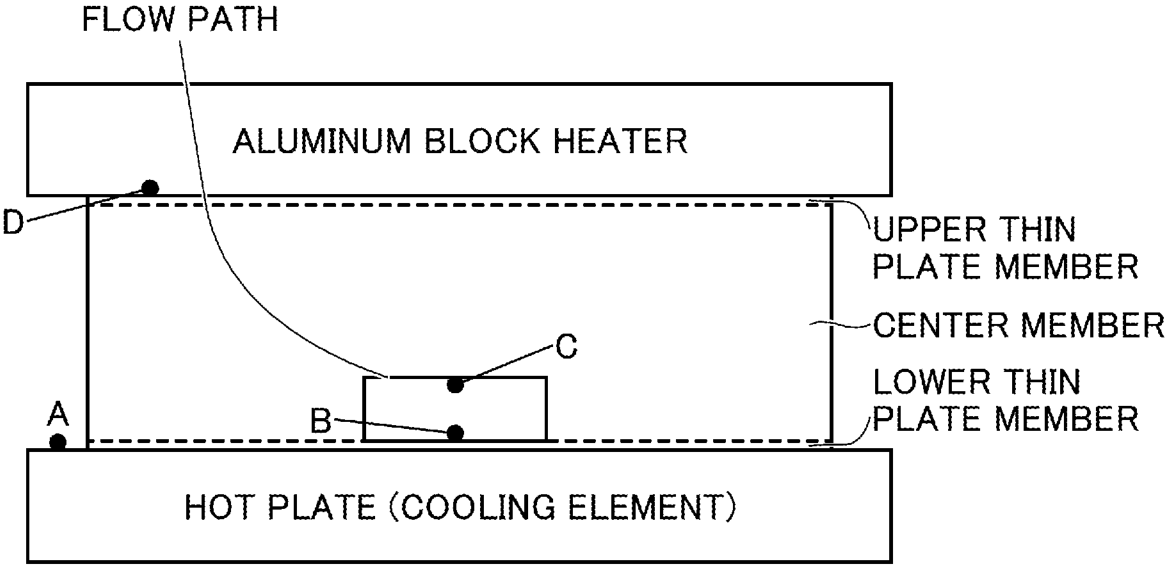
FIG. 26 is a view illustrating temperature measurement positions in Comparative Example 2.

In the same manner as in Example 1, the flow path plate for thermal cycle was placed on a hot plate to be used as the second temperature adjuster to make the lower surface of the flow path plate for thermal cycle contact the hot plate. An aluminum block heater was placed on the upper surface of the flow path plate for thermal cycle. Then, as illustrated in FIG. 26, thermocouples (GRAFTEC LOGGER GL240) were set on the surface of the hot plate (the point A in FIG. 26), on the lower surface (an internal surface of the flow path on the hot plate side) (the point B in FIG. 26) and the upper surface (an internal surface of the flow path in the center base material) (the point C in FIG. 26) of the flow path, and on the upper surface of the flow path plate for thermal cycle (the point D in FIG. 26).

Figure 27:
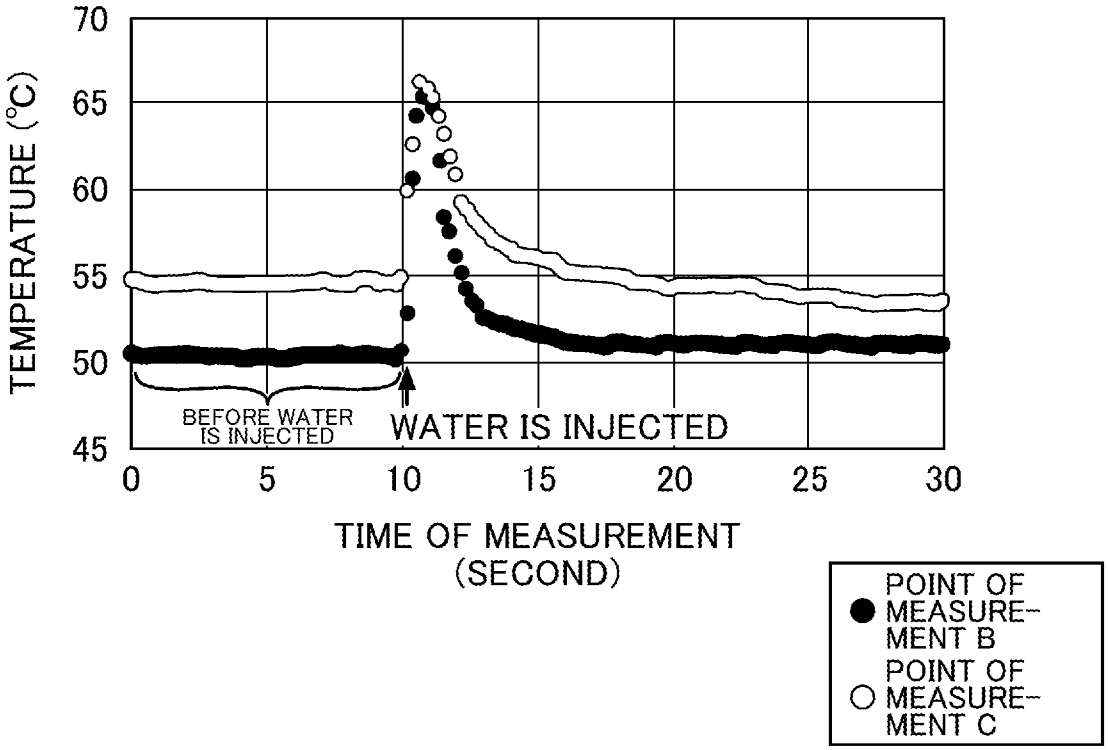
FIG. 27 is a graph indicating the temperature measurements at an upper surface and a lower surface of a flow path in a flow path plate for thermal cycle of Comparative Example 2.

The hot plate was heated to 50C to heat the lower surface of the flow path plate for thermal cycle to 50° C., and pure water (70° C.) was supplied into the flow path, to cool the pure water in the flow path. In order that the flow path plate for thermal cycle would not be cooled at anywhere other than the lower surface, the aluminum block heater was heated to 70° C., to heat the upper surface of the flow path plate for thermal cycle to 70° C. The temperature measurements from the lower surface (the internal surface of the flow path on the hot plate side) (the point B in FIG. 26) and the upper surface (the internal surface of the flow path in the center base material) (the point C in FIG. 26) of the flow path are indicated in FIG. 27.

As indicated in FIG. 21, in Example 1, the temperature in the upper surface side in the flow path rose to approximately the same temperature as that in the lower surface side in the flow path in a few seconds. On the other hand, as indicated in FIG. 23, in Comparative Example 1, the upper surface side in the flow path and the lower surface side in the flow path were kept at a large temperature difference, and the temperature in the lower surface side in the flow path did not rise to the same temperature as that in the upper surface side in the flow path. Hence, it can be said that when heating pure water, it is possible to heat the water in the flow path to a uniform temperature more quickly by heating the lower surface side of the flow path in the flow path plate for thermal cycle than by heating the upper surface side of the flow path in the flow path plate for thermal cycle. The reason for this can be said to be because a convection flow occurs in the pure water flowing through the flow path by the pure water flowing through the flow path being heated as a result of the lower surface side of the flow path in the flow path plate for thermal cycle being heated, making it possible to heat the pure water uniformly to a predetermined heating temperature in a shorter time.

As indicated in FIG. 25, in Example 2, the temperature in the upper surface side in the flow path fell to approximately the same temperature as that in the lower surface side in the flow path in a few seconds. On the other hand, as indicated in FIG. 27, in Comparative Example 2, the upper surface side in the flow path and the lower surface side in the flow path were kept at a large temperature difference, and the temperature in the upper surface side in the flow path did not fall to the same temperature as that in the lower surface side in the flow path. Hence, it can be said that when cooling pure water, it is possible to cool the water in the flow path to a uniform temperature more quickly by cooling the upper surface side of the flow path in the flow path plate for thermal cycle than by cooling the lower surface side of the flow path in the flow path plate for thermal cycle. The reason for this can be said to be because a convection flow occurs in the pure water flowing through the flow path by the pure water flowing through the flow path being cooled as a result of the upper surface side of the flow path in the flow path plate for thermal cycle being cooled, making it possible to cool the pure water uniformly to a predetermined cooling temperature in a shorter time.

The embodiments have been described above. However, the embodiments described above have been presented as examples, and the present invention is not to be limited by the embodiments described above. The embodiments described above can be carried out in various other modes, and various combinations, omissions, replacements, modifications, and the like are applicable within the scope of the spirit of the invention. The embodiments and modifications thereof are included in the scope and spirit of the invention, and are included in the scope of the invention described in the claims and equivalents thereof.

What is claimed is:

1. A flow path plate for thermal cycle, comprising:

a plate-shaped member extending in a horizontal direction;

a heating flow path extending in a horizontal direction in the plate-shaped member;

a cooling flow path extending in a horizontal direction in the plate-shaped member;

a connecting flow path connecting the heating flow path and the cooling flow path;

a heating-target surface contacted by a first temperature adjuster configured to heat the heating flow path; and a cooling-target surface contacted by a second temperature adjuster configured to cool the cooling flow path at a temperature lower than that by the first temperature adjuster, wherein a target sample is conveyed from the heating flow path to the cooling flow path, the heating-target surface is situated under the heating flow path, and the cooling-target surface is situated above the cooling flow path.

2. The flow path plate for thermal cycle according to claim 1, wherein the plate-shaped member includes a center base material, a lower thin plate member situated under the center base material, and an upper thin plate member situated above the center base material, the heating flow path is constituted by a space enclosed by a lower groove formed in a lower surface of the center base material and by the lower thin plate member, the cooling flow path is constituted by a space enclosed by an upper groove formed in an upper surface of the center base material and by the upper thin plate member, and the connecting flow path is constituted by a space through which the lower groove and the upper groove communicate with each other.

3. The flow path plate for thermal cycle according to claim 2, wherein the upper thin plate member and the lower thin plate member are made of a material having light transmissivity, and the connecting flow path is formed to penetrate the center base material in an upper-lower direction of the plate-shaped member.

4. The flow path plate for thermal cycle according to claim 1, wherein the sample contains a nucleic acid, and undergoes a nucleic acid amplification reaction in a flow path including the heating flow path and the cooling flow path.

5. A thermal cycle device, comprising:

a plate-shaped member extending in a horizontal direction;

a heating flow path extending in a horizontal direction in the plate-shaped member;

a cooling flow path extending in a horizontal direction in the plate-shaped member;

a connecting flow path connecting the heating flow path and the cooling flow path;

a conveying member configured to convey a target sample from the heating flow path to the cooling flow path;

a first temperature adjuster situated on a lower surface of the plate-shaped member and configured to heat a lower side in the heating flow path; and a second temperature adjuster situated on an upper surface of the plate-shaped member and configured to cool an upper side in the cooling flow path at a temperature lower than that by the first temperature adjuster.

* * * * *